United States Patent
Yamada

(10) Patent No.: US 10,007,467 B2
(45) Date of Patent: Jun. 26, 2018

(54) STORAGE SYSTEM

(71) Applicant: FUJITSU LIMITED, Kawasaki-shi, Kanagawa (JP)

(72) Inventor: Hidenori Yamada, Kita (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/450,086

(22) Filed: Mar. 6, 2017

(65) Prior Publication Data

US 2017/0262184 A1 Sep. 14, 2017

(30) Foreign Application Priority Data

Mar. 14, 2016 (JP) ................................ 2016-049351

(51) Int. Cl.
  *G06F 12/00* (2006.01)
  *G06F 3/06* (2006.01)

(52) U.S. Cl.
  CPC .............. *G06F 3/065* (2013.01); *G06F 3/067* (2013.01); *G06F 3/0619* (2013.01); *G06F 3/0646* (2013.01); *G06F 3/0647* (2013.01); *G06F 3/0656* (2013.01)

(58) Field of Classification Search
  CPC ...... G06F 3/065; G06F 3/0619; G06F 3/0656; G06F 3/067; G06F 3/0646; G06F 3/0647
  See application file for complete search history.

(56) References Cited

U.S. PATENT DOCUMENTS

| | | |
|---|---|---|
| 2003/0051111 A1 | 3/2003 | Nakano et al. |
| 2005/0210078 A1 | 9/2005 | Maruyama et al. |
| 2006/0212668 A1 | 9/2006 | Furukawa et al. |
| 2010/0030986 A1 | 2/2010 | Shinozaki et al. |
| 2011/0087850 A1 | 4/2011 | Kawada et al. |
| 2011/0093742 A1 | 4/2011 | Shinozaki |
| 2011/0197041 A1 | 8/2011 | Yamada et al. |
| 2011/0246599 A1 | 10/2011 | Kawada |
| 2011/0314221 A1 | 12/2011 | Kawada et al. |
| 2014/0059294 A1* | 2/2014 | Naruse .................. G06F 3/0689 711/114 |

FOREIGN PATENT DOCUMENTS

| | | |
|---|---|---|
| JP | 2003-122509 A | 4/2003 |
| JP | 2005-267216 A | 9/2005 |
| JP | 2006-260292 A | 9/2006 |

(Continued)

*Primary Examiner* — Shawn X Gu
(74) *Attorney, Agent, or Firm* — Fujitsu Patent Center

(57) ABSTRACT

A first control unit of a first control device executes: a synchronous copy process for writing data from a host device into a first storage medium, transmitting the data to a second control device, and replying to the host device; a storage process for storing the data written in the first storage medium into a first region, instructing the second control device on a buffer switch when a predetermined condition is satisfied, and switching a storage destination to a second region; and an asynchronous copy process for transmitting the data in the first region and the second region to a third control device at a time, respectively. A second control unit stores the data transmitted from the first control unit in a second storage medium and a third region, and when the buffer switch is instructed, stores the data in the second storage medium and a fourth region.

6 Claims, 20 Drawing Sheets

(56) References Cited

FOREIGN PATENT DOCUMENTS

| JP | 2010-039574 A | 2/2010 |
| JP | 2010-244583 A | 10/2010 |
| JP | 2011-086006 A | 4/2011 |
| JP | 2011-086160 A | 4/2011 |
| JP | 2011-164750 A | 8/2011 |
| JP | 2011-215947 A | 10/2011 |
| JP | 2012-003600 A | 1/2012 |

* cited by examiner

STORAGE SYSTEM

CROSS-REFERENCE TO RELATED APPLICATION

This application is based upon and claims the benefit of priority of the prior Japanese Patent Application No. 2016-049351, filed on Mar. 14, 2016, the entire contents of which are incorporated herein by reference.

FIELD

The embodiments discussed herein relate to a storage system.

BACKGROUND

Synchronous copy and asynchronous copy are known as methods of remote copy for copying data recorded in a storage device into another storage device for backup. In the synchronous copy, a copy source device stores data for which a write is requested from a host device, and creates a copy of the data in a copy destination device, and reports completion of the write to the host device after completing the copy. On the other hand, in the asynchronous copy, the copy source device reports the completion of the write to the host device when storing the data for which the write is requested, and creates a copy of the data in the copy destination device at an asynchronous time after the report.

Although data is always duplicated, the synchronous copy has a characteristic that a round-trip time (RTT) increases as the distance between devices increases, deteriorating responsivity to writing. Hence, the asynchronous copy is suitable for application in which the copy destination device is located at a long distance, considering a large scale disaster that affects a wide area.

In this connection, there is proposed a system in which storage devices are located at three sites, and synchronous copy is performed from a first storage device to a second storage device, and asynchronous copy is performed from the first storage device to a third storage device. According to this system, not only the possibility of losing data is reduced by the increase of backup sites, but the third storage device can be located at a long distance without deteriorating the responsivity of the first storage device to the host device.

Also, the next method capable of copying with the order maintained is proposed as an example of asynchronous copy technology. In this method, a copy source device stores data of a first storage medium in a first record buffer, and when this buffer becomes full, transmits the data in the buffer to a copy destination device at a time. The copy destination device receives and stores the data in a second record buffer, and when reception of the data is completed, spreads the data in the buffer to a second storage medium.

See, for example, Japanese Laid-open Patent Publication Nos. 2003-122509 and 2006-260292.

Here, it is assumed that asynchronous copy is performed with the order maintained, by applying the above method using the record buffers to the above system including the first to third storage devices located at three sites. According to this configuration, when the first storage device stops operating due to failure or the like, the second storage device can take over in/out (I/O) processing according to a request from the host device. However, when the first storage device stops operating, it is possible that the data stored in the second storage device is not identical with the data stored in the third storage device. It is possible that the order of writes is broken if these data are made identical in order to start the asynchronous copy. In order to make these data identical with each other while maintaining their order, the copy destination of the synchronous copy needs to be equipped with a mechanism for maintaining the order of the data for which the asynchronous copy has not been executed yet.

SUMMARY

According to one aspect, there is provided a storage system including: a first control device; a second control device; and a third control device, wherein the first control device includes: a first buffer including a first region and a second region, and a first processor configured to execute: a synchronous copy process for writing first data for which a write is requested from a host device into a first storage medium, transmitting the first data to the second control device, and reporting write completion to the host device, a storage process for storing the first data, which has been written in the first storage medium, into the first region, and when a predetermined condition is satisfied, transmitting an instruction of a buffer switch to the second control device, and switching a data storage destination in the first buffer to the second region with respect to second data that is written into the first storage medium after the instruction, and an asynchronous copy process for transmitting third data stored in the first region to the third control device at a time, and transmitting fourth data stored in the second region to the third control device at a time, the second control device includes: a second buffer including a third region and a fourth region, and a second processor configured to store the first data transmitted from the first processor in a second storage medium and the third region, and when receiving the instruction of the buffer switch, store the second data transmitted from the first processor after the instruction in the second storage medium and the fourth region, the third control device includes: a third buffer including a fifth region and a sixth region, and a third processor configured to receive the third data to store the third data in a third storage medium via the fifth region, and receive the fourth data to store the fourth data in the third storage medium via the sixth region.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
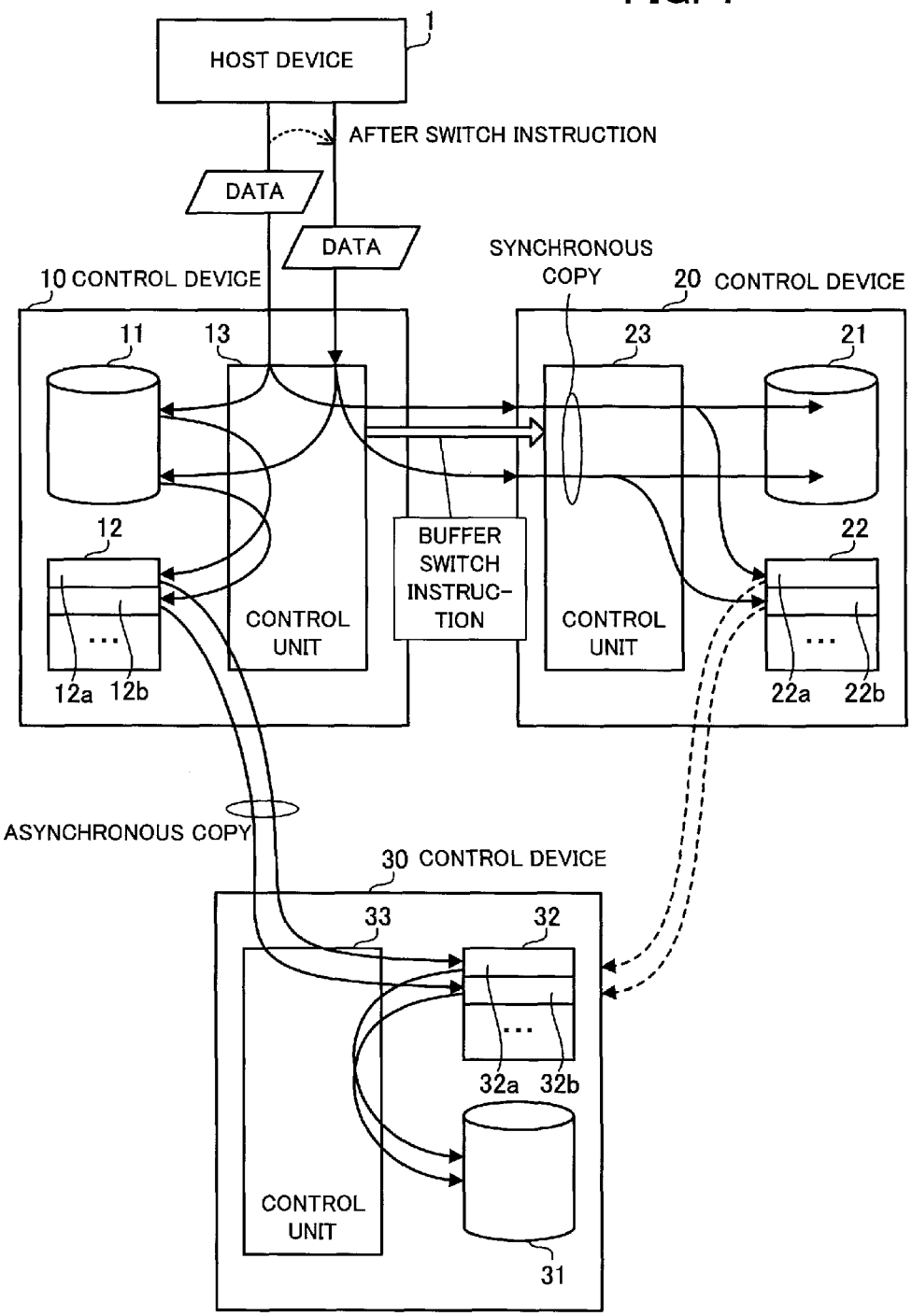
FIG. 1 illustrates an exemplary configuration and an exemplary process of a storage system according to a first embodiment.

Several embodiments will be described below with reference to the accompanying drawings, wherein like reference numerals refer to like elements throughout.

First Embodiment

FIG. 1 illustrates an exemplary configuration and an exemplary process of a storage system according to a first embodiment. The storage system illustrated in FIG. 1 includes control devices 10, 20, and 30. Also, a host device 1 can be connected to either one of the control devices 10 and 20.

The control devices 10, 20, and 30 include storage media 11, 21, and 31, respectively. Note that the storage media 11, 21, and 31 are provided inside the respective control devices 10, 20, and 30 in the example in FIG. 1, but may be connected to outsides of the respective control devices 10, 20, and 30.

The control device 10 controls accesses to the storage medium 11 in accordance with a request from the host device 1. Also, the control device 10 has a function for copying the data written in the storage medium 11 to the storage media 21 and 31 of the control devices 20 and 30 for the purpose of backup. Synchronous copy is executed from the control device 10 to the control device 20, and asynchronous copy is executed from the control device 10 to the control device 30.

The control device 20 receives the data written in the storage medium 11 from the control device 10, and writes the received data into the storage medium 21. Also, the control device 20 takes over a process according to a write request from the host device 1 from the control device 10, when operation of the control device 10 stops due to occurrence of a failure or the like. That is, in this state, the control device 20 controls accesses to the storage medium 21 in accordance with a request from the host device 1. In addition, the control device 20 backs up the data written in the storage medium 21 into the storage medium 31 of the control device 30 by asynchronous copy. The control device 30 writes into the storage medium 31 the data transmitted from the control device 10 or the control device 20.

Also, the control device 10 further includes a buffer 12 and a control unit 13. The buffer 12 is allocated in a random access memory (RAM) of the control device 10, for example. The control unit 13 is configured with a processor of the control device 10, for example. The control device 20 further includes a buffer 22 and a control unit 23. The buffer 22 is allocated in a RAM of the control device 20, for example. The control unit 23 is configured with a processor of the control device 20, for example. The control device 30 further includes a buffer 32 and a control unit 33. The buffer 32 is allocated in a RAM of the control device 30, for example. The control unit 33 is configured with a processor of the control device 30, for example.

The data that is to be transmitted from the storage medium 11 to the control device 30 is stored in the buffer 12 temporarily. The data that is written into the storage medium 21 is stored in the buffer 22 temporarily. The data transmitted from the control device 10 or the control device 20 is stored in the buffer 32 temporarily. Each of these buffers 12, 22, and 32 consists of a plurality of regions. In the example of FIG. 1, the buffer 12 includes regions 12a and 12b, and the buffer 22 includes regions 22a and 22b, and the buffer 32 includes regions 32a and 32b.

The control unit 13 executes "synchronous copy process", "storage process", and "asynchronous copy process", which are described below.

In the synchronous copy process, the control unit 13 writes into the storage medium 11 the data for which a write is requested from the host device 1, and transmits the written data to the control device 20, and reports write completion to the host device 1. The control unit 23 stores the data transmitted from the control unit 13 in the storage medium 21 and the region 22a of the buffer 22. Note that the storage of the data into the region 22a may be executed at an asynchronous time from the storage to the storage medium 21. That is, by the synchronous copy process, the data stored in the storage medium 11 is always identical with the data stored in the storage medium 21 at least.

In the storage process, the control unit 13 stores the data written in the storage medium 11 into the region 12a of the buffer 12. Then, when a predetermined condition is satisfied, the control unit 13 instructs a switch of buffer region to the control device 20 and switches the buffer region, which is the storage destination of the data that is written into the storage medium 11 from the host device 1, from the region 12a to the region 12b of the buffer 12. Thus, the data written in the storage medium 11 is stored in the region 12b during the storage process after the instruction of buffer switch.

When the buffer switch is instructed from the control unit 13, the control unit 23 stores the data that is transmitted from the control unit 13 after the instruction in the storage medium 21 and the region 22b of the buffer 22. That is, the control unit 23 switches the storage destination of the data written in the storage medium 21 from the region 22a to the region 22b after the buffer switch is instructed.

In the asynchronous copy process, the control unit transmits the data stored in the region 12a to the control device 30 at a time. That is, after the storage of the data in the region 12a is completed, the control unit 13 transmits the data in the region 12a to the control device 30. Also, the control unit 13 transmits the data stored in the region 12b to the control device 30 at a time.

The control unit 33 receives the data of the region 12a transmitted from the control unit 13, and stores the received data temporarily in the region 32a of the buffer 32, and thereafter stores the temporarily stored data in the storage medium 31. Also, the control unit 33 receives the data of the region 12b transmitted from the control unit 13, and stores the received data temporarily in the region 32b of the buffer 32, and thereafter stores the temporarily stored data in the storage medium 31.

According to this asynchronous copy, the data is copied in each region of the buffer. Thus, the asynchronous copy is executed between the control device 10 and the control device 30 so as to maintain the order of writes from the host device 1.

On the other hand, in the synchronous copy between the control device 10 and the control device 20, switch timing of the utilized regions in the buffers is synchronized by the instruction of the buffer switch. Thereby, the data can be copied in each region of the buffer from the control device 10 to the control device 20 as well. As a result, the order of writes is maintained in the data retained by the control device 20 with regard to the data for which the asynchronous copy has not been executed from the control device 10 to the control device 30.

As described above, the data is copied in each region of the buffer from the control device 10 to both of the control devices 20 and 30, and thereby when the control device 10 stops operating due to a failure or the like, the asynchronous copy is executed between the control device 20 and the control device 30 so as to maintain the order.

For example, when the control device 10 stops operating after the instruction of the buffer switch, the control device 20 takes over from the control unit 13 the reception process of the write request from the host device 1. Then, the control device 20 stores the data for which the write is requested from the host device 1 in the storage medium 21 and the region 22b of the buffer 22. In addition, the control device 20 transmits the data stored in the region 22a to the control device 30. The control device 30 receives the data of the region 22a transmitted from the control unit 23 and stores the received data in the storage medium 31 via the region 32a.

As described above, after the control device 10 stops operating, the asynchronous copy is executed for each region of the buffer from the control device 20 to the control device 30. Thus, the asynchronous copy is executed to maintain the order between the control device 20 and the control device 30.

Second Embodiment

Figure 2:
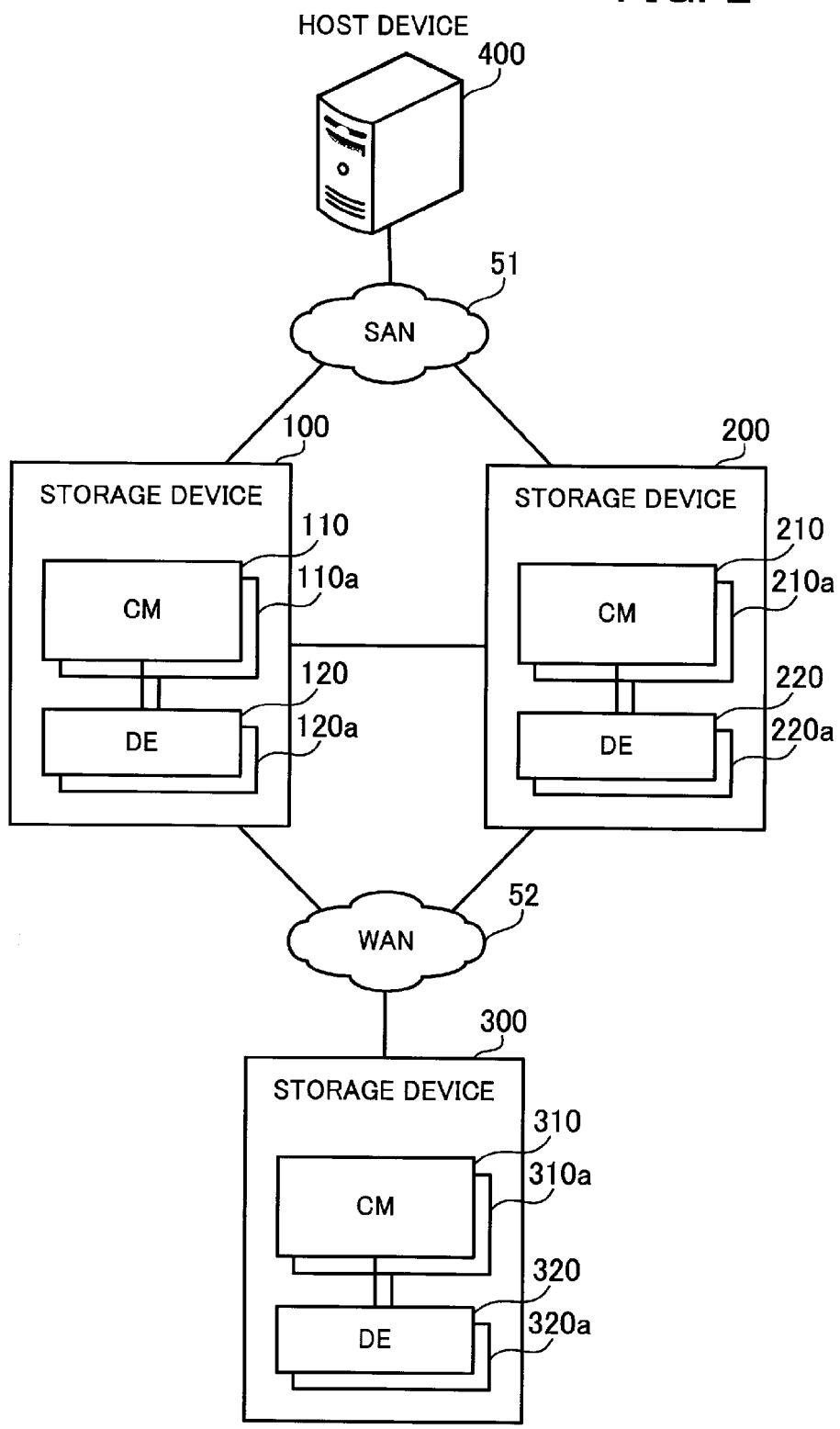
FIG. 2 illustrates an exemplary configuration of a storage system according to a second embodiment.

FIG. 2 illustrates an exemplary configuration of a storage system according to a second embodiment. The storage system illustrated in FIG. 2 includes storage devices 100, 200, and 300 and a host device 400. The host device 400 and the storage devices 100 and 200 are connected via a storage area network (SAN) 51, for example. The storage device 100 and the storage device 200 are connected via a dedicated communication line for example, and the storage devices 100 and 200 and the storage device 300 are connected via a wide area network (WAN) 52, for example. The storage device 300 is located at a longer distance than the distance between the storage device 100 and the storage device 200.

The storage device 100 includes the controller modules (CMs) 110 and 110a and the drive enclosures (DEs) 120 and 120a. A plurality of memory devices are provided in each of the drive enclosures 120 and 120a. Those memory devices are hard disk drives (HDDs) for example, and in that case the drive enclosures 120 and 120a are disk array devices. The controller module 110 is a control device that controls accesses to the memory devices in the drive enclosure 120, and the controller module 110a is a control device that controls accesses to the memory devices in the drive enclosure 120a.

In the same way, the storage device 200 includes controller modules 210 and 210a and drive enclosures 220 and 220a, and the storage device 300 includes controller modules 310 and 310a and drive enclosures 320 and 320a. Note that the controller modules 110, 110a, 210, 210a, 310, and 310a are connected to each other in the storage system of FIG. 2.

The controller module 110 can control accesses to a logical volume that is configured with the memory devices in the drive enclosure 120, in accordance with a request from the host device 400. In the same way, the controller module 110a can control accesses to a logical volume that is configured with the memory devices in the drive enclosure 120a, in accordance with a request from the host device 400. The controller modules 110 and 110a control accesses by a distributed cache method in which each of the controller modules 110 and 110a has a cache for access to the corresponding logical volume.

The storage device 200 is in a waiting state, when the storage device 100 is in an operating state. In this state, the controller modules 210 and 210a receive the data from the caches in the controller modules 110 and 110a respectively and back up the data. The data in the cache in the storage device 100 is backed up in the storage device 200 by synchronous copy. Then, when a failure occurs in the storage device 100, the storage device 200 changes to an operating state from the waiting state (i.e., fail-over) and takes over the access control to the logical volume according to the request from the host device 400 in a short time.

When the storage device 100 is in an operating state, the storage device 300 also receives the data from the cache in the storage device 100 and backs up the data. Specifically, the controller modules 310 and 310a receive the data from the caches in the controller modules 110 and 110a respectively and back up the data. Note that the data in the cache in the storage device 100 is backed up in the storage device 200 by asynchronous copy. Then, when a failure occurs in the storage device 100, the storage device 300 backs up the data in the cache of the storage device 200 that has changed to an operating state.

As described above, in the storage system illustrated in FIG. 2, the cache data is backed up triply when the storage devices 100, 200, and 300 operate normally, thereby reducing the risk of losing the cache data. If the data is backed up by synchronous copy in the storage device 300 which is located at a remote place, the RTT increases to significantly decrease the reply speed to the host device 400. However, according to the storage system of FIG. 2, the data is backed up in the storage device 300 by the asynchronous copy, thereby preventing such decrease of the reply speed. In other words, the storage device 300 can be located at a remote place without deteriorating the responsivity to the host device 400, thereby reducing the risk of losing the data when a large disaster that affects a wide area occurs.

Figure 3:
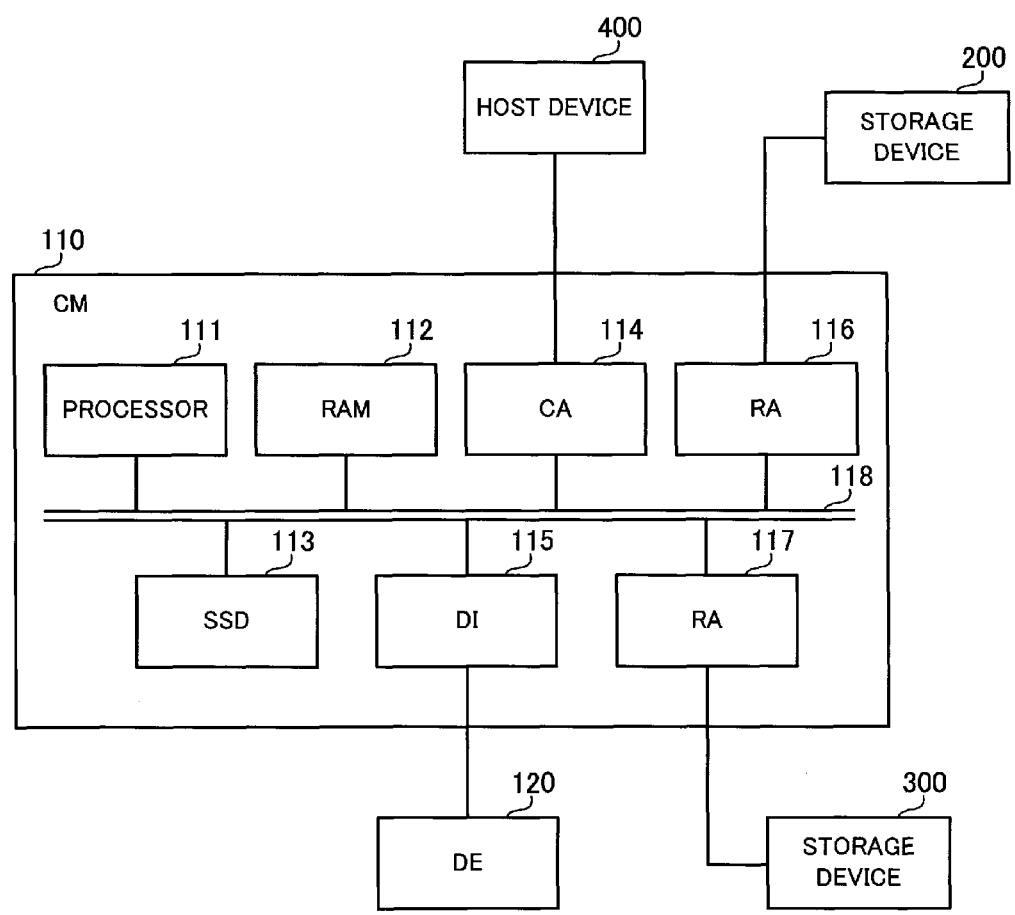
FIG. 3 illustrates an exemplary hardware configuration of a controller module.

FIG. 3 illustrates an exemplary hardware configuration of a controller module. FIG. 3 illustrates a controller module 110. The controller module 110 includes a processor 111, a RAM 112, a solid state drive (SSD) 113, a channel adapter (CA) 114, a drive interface (DI) 115, and remote adapters (RAs) 116 and 117. These components are connected via a bus 118.

The processor 111 controls the entire controller module 110. The processor 111 may be a multiprocessor. The processor 111 is a central processing unit (CPU), a micro processing unit (MPU), a digital signal processor (DSP), an application specific integrated circuit (ASIC), or a programmable logic device (PLD), for example. Also, the processor 111 may be a combination of two or more elements of a CPU, an MPU, a DSP, an ASIC, and a PLD.

The RAM 112 is used as a main memory device of the controller module 110. The RAM 112 temporarily stores at least a part of an operating system (OS) program and application programs executed by the processor 111. Also, the RAM 112 stores various types of data used in processing by the processor 111.

The SSD 113 is used as an auxiliary memory device of the controller module 110. The SSD 113 stores an OS program, application programs, and various types of data. Note that memory devices of other types, such as an HDD, may be used as the auxiliary memory device.

The channel adapter 114 is an interface for communicating with the host device 400. The drive interface 115 is an interface for communicating with the drive enclosure 120. The drive interface 115 is a serial attached SCSI (SAS) interface, for example. The remote adapter 116 is an interface for communicating with the storage device 200, and the remote adapter 117 is an interface for communicating with the storage device 300.

The processing function of the controller module 110 is configured with the above hardware configuration. Note that the controller modules 110a, 210, 210a, 310, and 310a are also configured with the same hardware configuration as FIG. 3.

By the way, as described above, the data written in the cache of the storage device 100 is remotely copied in the storage devices 200 and 300. Also, synchronous copy is performed between the storage device 100 and the storage device 200, and asynchronous copy is performed between the storage device 100 and the storage device 300. In particular, asynchronous copy is performed between the storage device 100 and the storage device 300 so as to maintain the order of data writes.

Figure 4:
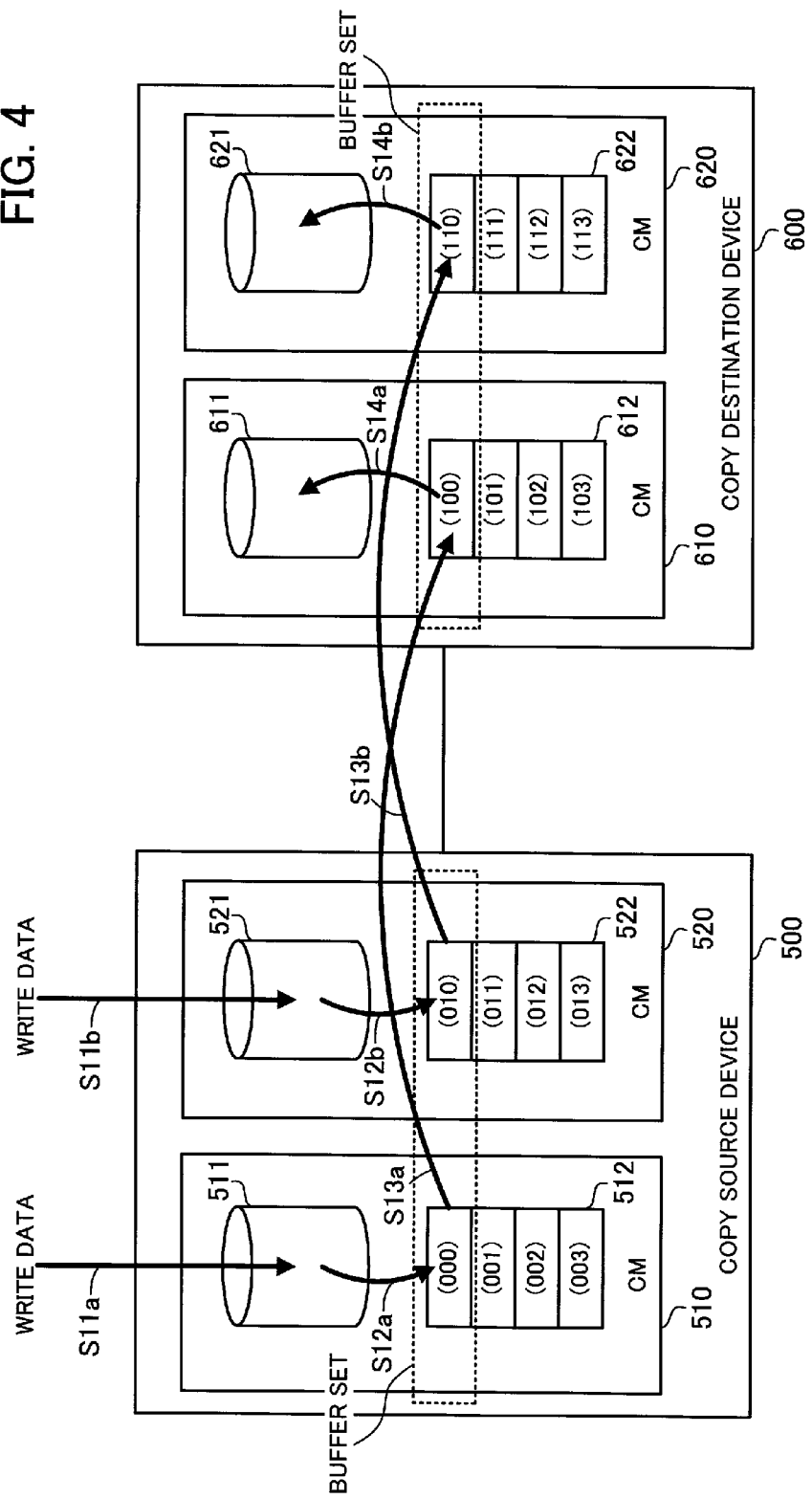
FIG. 4 is a reference diagram for describing an asynchronous copy technology in which order is maintained.

Here, an order-maintaining asynchronous copy technology, which is utilized in the present embodiment, will be described with reference to FIG. 4. FIG. 4 is a reference diagram for describing the order-maintaining asynchronous copy technology. FIG. 4 illustrates an exemplary configuration in which a copy source device 500 receives write data transmitted from the host device (not depicted), and the write data are backed up in a copy destination device 600 by asynchronous copy.

The copy source device 500 includes controller modules 510 and 520, and the copy destination device 600 includes controller modules 610 and 620. The controller modules 510 and 520 include storage media 511 and 521 of copy source, and buffers 512 and 522 utilized in the asynchronous copy, respectively. The controller modules 610 and 620 include storage media 611 and 621 of copy destination, and buffers 612 and 622 utilized in the asynchronous copy, respectively. The buffers 512, 522, 612, and 622 are each divided into a plurality of divided regions.

Note that the numbers assigned to the divided regions in FIG. 4 indicate IDs of the divided regions. In the below description, a divided region whose ID is "xxx" is referred to as "divided region (xxx)".

In the asynchronous copy process, one divided region is selected from each of the buffers 512, 522, 612, and 622, and the selected divided regions are utilized to store the write data that are written from the host device during the same period. Thus, in the below description, each divided region is sometimes identified with a concept "generation". In the example of FIG. 4, the divided regions (000), (010), (100), and (110) belong to the same generation. Also, the divided regions (001), (011), (101), and (111) belong to the same generation. Also, the divided regions (002), (012), (102), and (112) belong to the same generation. Also, the divided regions (003), (013), (103), and (113) belong to the same generation. Also, a combination of divided regions that belong to the same generation is referred to as "buffer set".

Upon receiving a write request from the host device, the controller module 510 writes the write data transmitted from the host device into the storage medium 511 (step S11a) and reports write completion to the host device. In the same way, the controller module 520 writes the write data transmitted from the host device into the predetermined storage medium 521 (step S11b), and reports write completion to the host device.

The controller module 510 stores (copies) the data written in the storage medium 511 into the divided region (000) at an asynchronous time from the write into the storage medium 511 (step S12a). In the same way, the controller module 520 stores (copies) the data written in the storage medium 522 into the divided region (010) at an asynchronous time from the write into the storage medium 522 (step S12b).

Thereafter, when the copy source device 500 runs out of remaining capacity in at least one of the divided regions (000) and (010), or when a certain amount of time has elapsed, the buffer set is switched. Switching the buffer set means switching the divided regions that are the storage destinations of the write data. In response to occurrence of switch of the buffer set, the storage destinations of the data written into the storage media 511 and 521 are switched to the divided regions (001) and (011) that belong to a next-generation buffer set, respectively. Along with this, the divided regions (000) and (010) that belong to a previous-generation buffer set become targets of transfer.

When the controller module 510 runs out of remaining capacity of the divided region (000), or when a certain amount of time has elapsed, the controller module 510 transfers the data stored in the divided region (000) to the controller module 610 of the copy destination device 600 at a time (step S13a). In the same way, the controller module 520 transfers the data stored in the divided region (010) to the controller module 620 of the copy destination device 600 at a time (step S13b).

The controller module 610 stores the data received from the controller module 510 temporarily in the divided region (100), and when having stored all the data, writes the data stored in the divided region (100) into the storage medium 611 (step S14a). In the same way, the controller module 620 stores the data received from the controller module 520 temporarily in the divided region (110), and when having stored all the data, writes the data stored in the divided region (110) into the storage medium 621 (step S14b). In the following, writes from the buffers 612 and 622 into the storage media 611 and 621 are referred to as "spread".

When spreading of the data stored in the divided regions (100) and (110) is completed, the buffer set to which the divided regions (000), (010), (100), and (110) belong is set back to unused regions. Setting the divided regions back to unused regions as described above is referred to as "release". As above, the order is maintained by transferring the data between the devices and spreading the data from the buffers to the storage media with respect to each buffer set by means of the copy buffers.

Description continues with reference to FIG. 2. In the storage system according to the present embodiment illustrated in FIG. 2 as well, asynchronous copy is performed with the order maintained between the storage device 100 and the storage device 300 by using the technology illustrated in FIG. 4 basically. Also, when a failure occurs in the storage device 100, the storage device 200 takes over the access control according to the request from the host device 400. In this case, one problem in this storage system is taking over the asynchronous copy with the order maintained between the storage device 200 and the storage device 300 in as short a time as possible.

The storage device 100 and the storage device 200 always retain the same data by the synchronous copy. On the other hand, when a failure occurs in the storage device 100 while the data is transferred by the asynchronous copy between the storage device 100 and the storage device 300, the data do not become identical between the storage device 200 and the storage device 300. One can conceive a method in which the storage device 200 restarts the access control according to the request from the host device 400 after making the data identical with each other between the storage device 200 and the storage device 300. However, in this case, it takes time until the restart of the access control. In addition, the order needs to be controlled to be maintained, when the data are made identical with each other.

To solve this problem, in the present embodiment, a pseudo copy session, which is referred to as "delta copy session", is set between the storage device 200 and the storage device 300, when the storage device 100 is in an operating state. In this delta copy session, a buffer for asynchronous copy after fail-over is provided in the storage device 200 in advance. In addition, switch and release of the buffer set are synchronized between the storage device 100 and the storage device 200, and thereby the control state of the buffer of the storage device 200 is kept in an identical state with the buffer of the storage device 100.

This enables the storage device 200 to take over the data transfer of the asynchronous copy, which was executed with the storage device 300 immediately before the fail-over, in a short time after the fail-over. In addition, the storage device 200 can take over the access control according to the request from the host device 400 in a short time, while executing the taken-over data transfer in the background.

Figure 5:
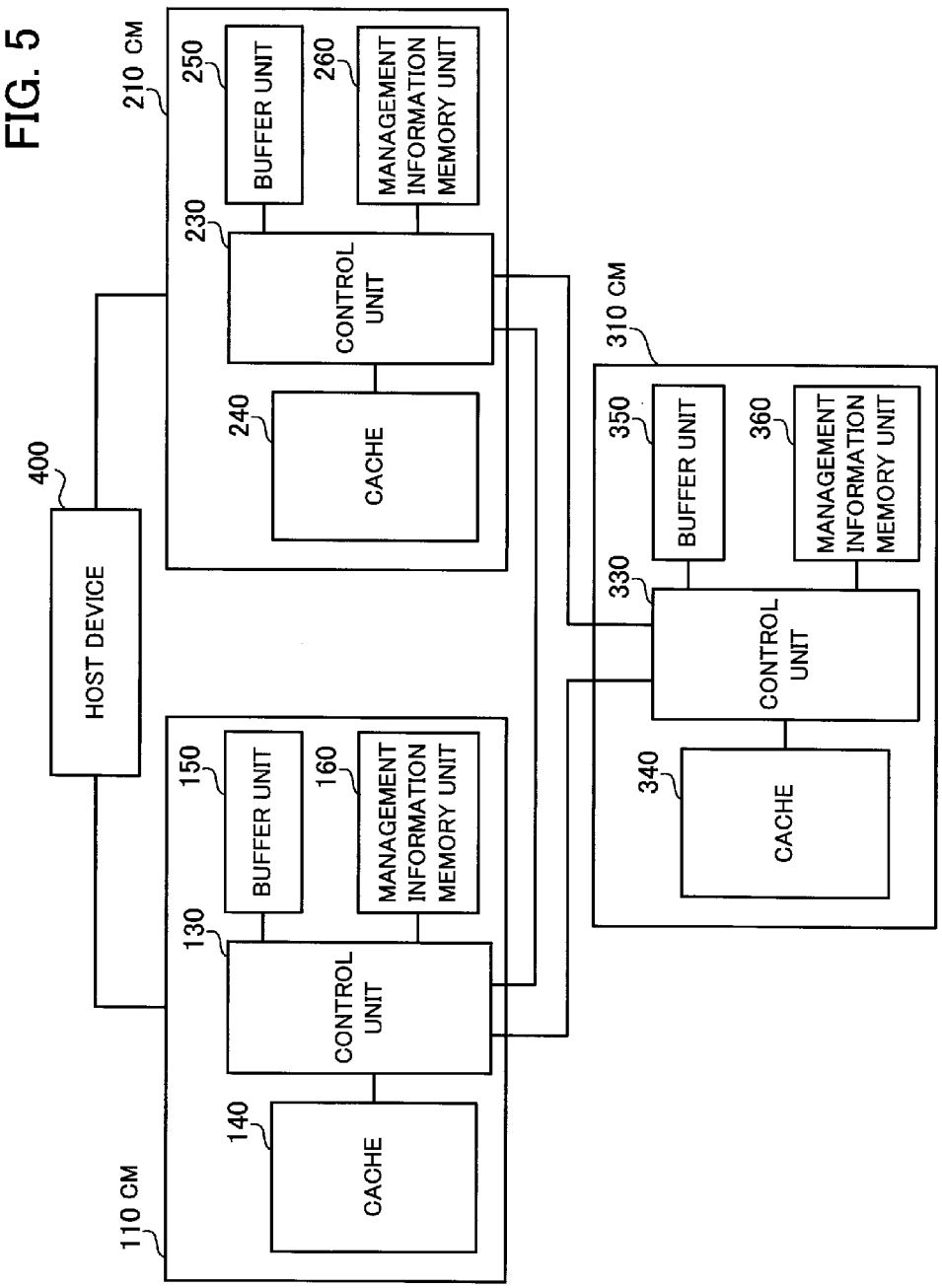
FIG. 5 is a block diagram illustrating an exemplary configuration of processing functions of controller modules.

FIG. 5 is a block diagram illustrating an exemplary configuration of processing functions of the controller modules. First, the controller module 110 includes a control unit 130, a cache 140, a buffer unit 150, and a management information memory unit 160. Processing of the control unit 130 is achieved by the processor 111 executing a predetermined program. The cache 140 and the buffer unit 150 are allocated in a part of the memory region of the RAM 112. The management information memory unit 160 is allocated in a part of the memory region of the RAM 112 or the SSD 113.

The control unit 130 controls accesses to a logical volume according to a request from the host device 400 by using the cache 140. For example, the control unit 130 controls the accesses to the logical volume by using a write-through method. Also, the control unit 130 executes a copy process of the data written in the cache 140 into the controller modules 210 and 310.

At least a part of the data in the logical volume to be accessed from the host device 400 is stored in the cache 140 temporarily. The data that is transferred from the cache 140 to the controller modules 210 and 310 is stored in the buffer unit 150 temporarily. Various types of information that is referred to during the copy process is stored in the management information memory unit 160.

Note that, although not depicted, the controller module 110a has the same processing function as the controller module 110. Note that the controller module 110 operates as a master, and the controller module 110a operates as a slave, in the control of the entire remote copy process, such as buffer generation management.

The controller module 210 includes a control unit 230, a cache 240, a buffer unit 250, and a management information memory unit 260. Processing of the control unit 230 is achieved by the processor of the controller module 210 executing a predetermined program. The cache 240 and the buffer unit 250 are allocated in a part of the memory region of the RAM of the controller module 210. The management information memory unit 260 is allocated in a part of the memory region of the RAM or the SSD of the controller module.

The control unit 230 executes a process for storing the data transferred from the controller module 110 in the cache 240, when the storage device 100 is in an operating state. In this case, the control unit 230 transmits index information of the data stored in the cache 240 to the controller module 310 for the purpose of data verification. Also, when the storage device 100 stops operating due to failure occurrence, the control unit 230 takes over the access control to the logical volume from the control unit 130 of the controller module 110. In this case, the control unit 230 controls accesses to the logical volume according to the request from the host device 400 by using the cache 240. In addition, the control unit 230 executes a process for copying the data in the cache 240 to the controller module 310 asynchronously.

When the storage device 100 is in an operating state, the copy data corresponding to the data stored in the cache 140 of the controller module 110 is stored in the cache 240. Also, the data transferred from the controller module 110 is stored in the buffer unit 250 temporarily. When the storage device 200 changes to an operating state, the cache 240 is utilized in access to the logical volume, and the data transferred from the cache 240 to the controller module 310 is stored in the buffer unit 250 temporarily.

Various types of information that is referred to during the copy process is stored in the management information memory unit 260. Note that, although not depicted, the controller module 210a has the same processing function as the controller module 210.

The controller module 310 includes a control unit 330, a cache 340, a buffer unit 350, and a management information memory unit 360. Processing of the control unit 330 is achieved by the processor of the controller module 310 executing a predetermined program. The cache 340 and the buffer unit 350 are allocated in a part of the memory region of the RAM of the controller module 310. The management information memory unit 360 is allocated in a part of the memory region of the RAM or the SSD of the controller module.

The control unit 330 stores in the cache 340 the data transferred from either one of the controller module 110 or 210 that is in an operating state. The copy data corresponding to the data stored in the cache 140 of the controller module 110 or the cache 240 of the controller module 210 is stored in the cache 340. The data transferred from the controller module 110 or the controller module 210 is stored in the buffer unit 350 temporarily. Various types of information that is referred to during the copy process, i.e. the process for storing the received data in the cache 340, is stored in the management information memory unit 360. Note that, although not depicted, the controller module 310a has the same processing function as the controller module 310.

Figure 6:
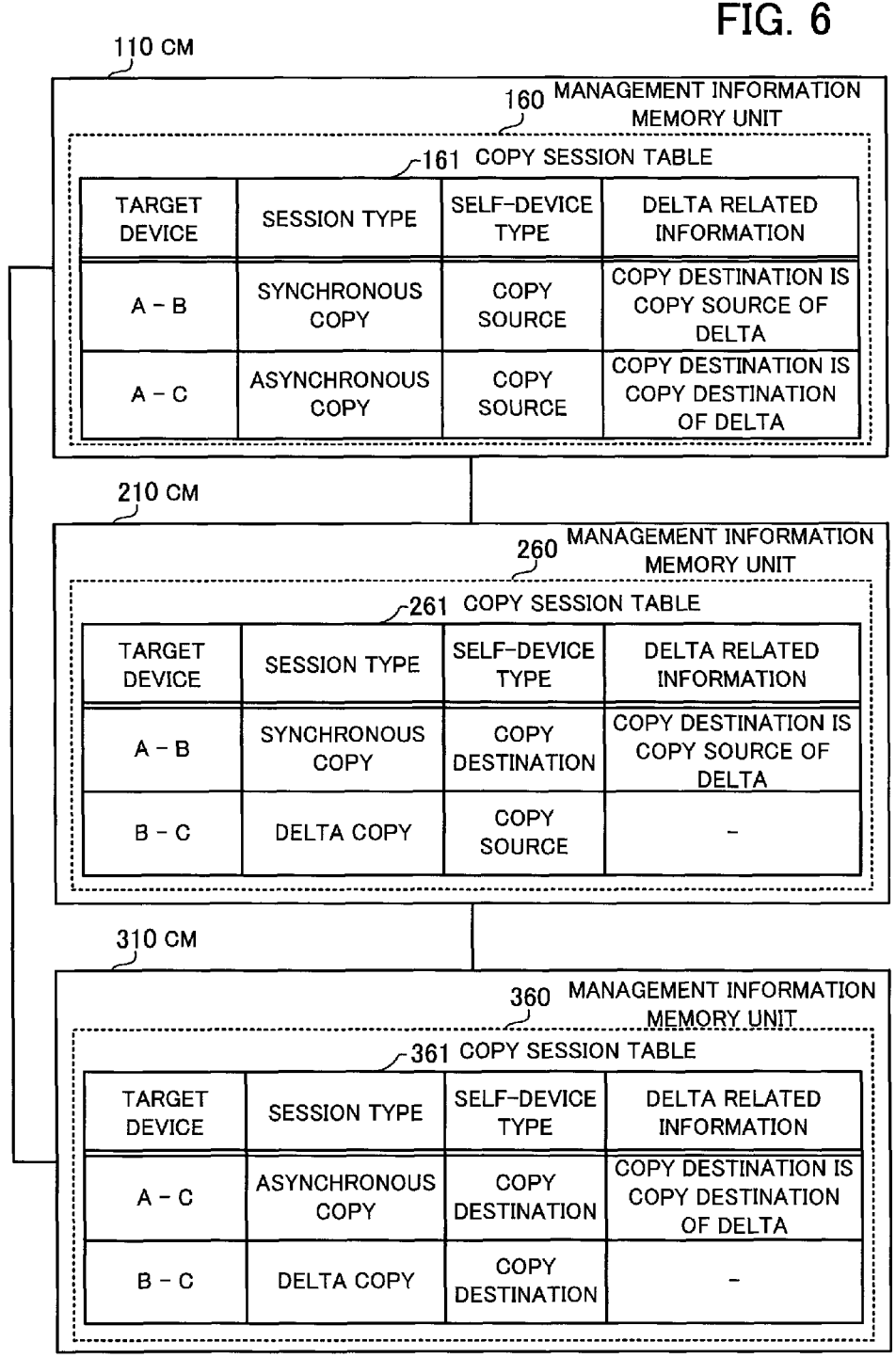
FIG. 6 illustrates an exemplary configuration of copy session tables.

FIG. 6 illustrates an exemplary configuration of copy session tables. In the present embodiment, a synchronous copy session is set between the storage device 100 and the storage device 200, when the storage device 100 is operated normally. Also, an asynchronous copy session is set between the storage device 100 and the storage device 300. Further, the aforementioned delta copy session is set between the storage device 200 and the storage device 300.

A copy session table 161 that contains information of copy sessions for the storage device 100 is stored in the management information memory unit 160 of the controller module 110. In the same way, a copy session table 261 that contains information of copy sessions for the storage device 200 is stored in the management information memory unit 260 of the controller module 210. Also, a copy session table 361 that contains information of copy sessions for the storage device 300 is stored in the management information memory unit 360 of the controller module 310.

The copy session tables 161, 261, and 361 include fields of target device, session type, self-device type, and delta related information. The field of target device contains entries of identification information of the storage devices to which copy sessions are set. Note that, in FIG. 6, devices "A", "B", and "C" indicate the storage devices 100, 200, and 300, respectively. The field of session type contains entries of types of copy session. The field of self-device type contains entries of information indicating whether the device itself is a copy source or a copy destination in a copy session.

The field of delta related information contains entries of information indicating whether the device to which a synchronous copy session or an asynchronous copy session is set is a copy source or a copy destination in a delta copy session. In the delta copy session, a process is performed not only between the storage devices to which the delta copy session is set, but also with another storage device. The controller module to which the synchronous copy session or the asynchronous copy session is set can recognize what process related to the delta copy session to execute, by referring to the delta related information.

Note that, although not depicted, a copy session table that contains entries of the same information as the copy session table 161 is stored in the management information memory unit of the controller module 110a. In the same way, a copy session table that contains entries of the same information as the copy session table 261 is stored in the management information memory unit of the controller module 210a. Also, a copy session table that contains entries of the same information as the copy session table 361 is stored in the management information memory unit of the controller module 310a.

Figure 7:
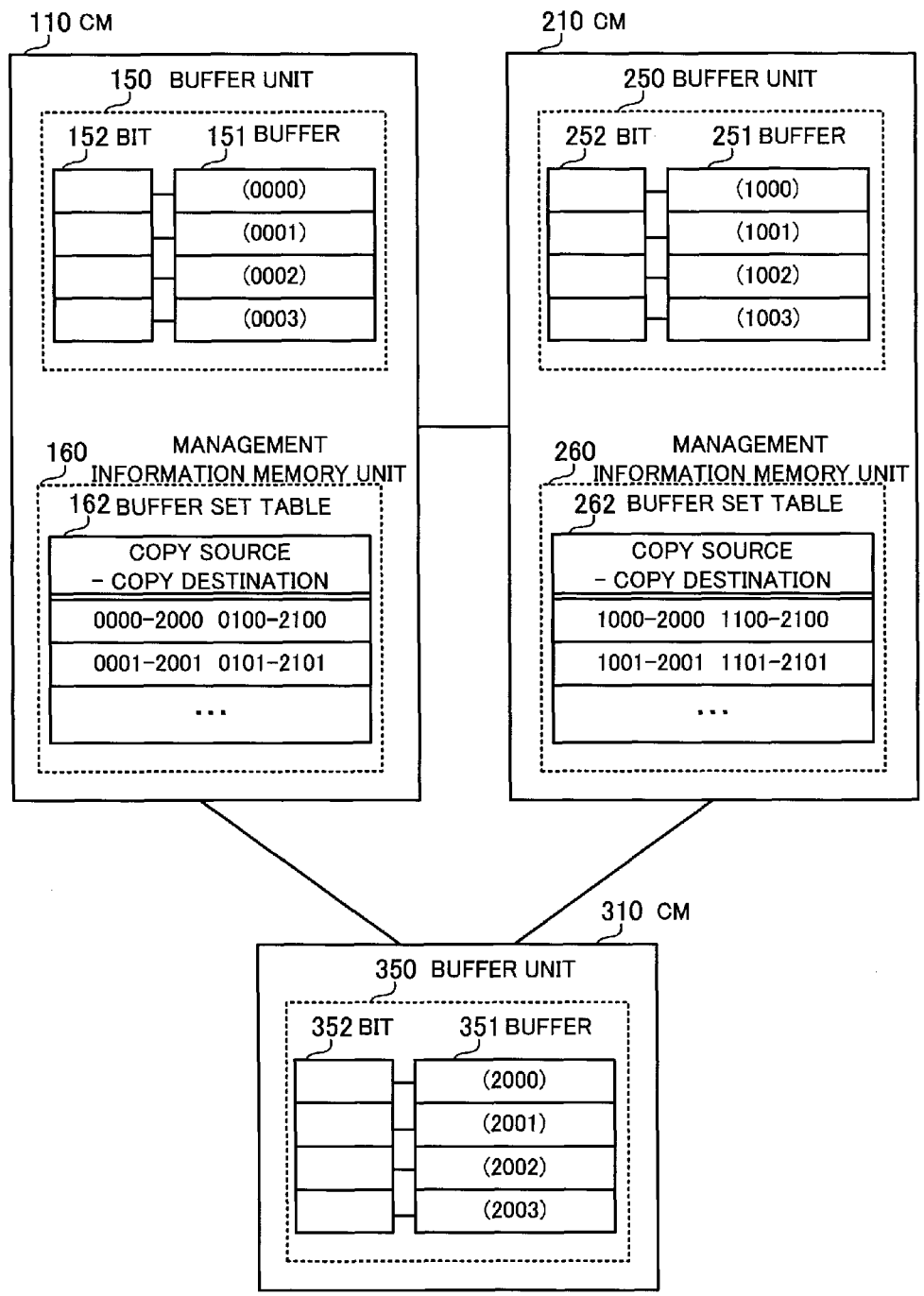
FIG. 7 illustrates an exemplary configuration of buffer units and buffer set tables.

FIG. 7 illustrates an exemplary configuration of the buffer units and buffer set tables. The buffer unit 150 of the controller module 110 includes a buffer 151 and a buffer index table (BIT) 152. In the same way, the buffer unit 250 of the controller module 210 includes a buffer 251 and a buffer index table 252, and the buffer unit 350 of the controller module 310 includes a buffer 351 and a buffer index table 352.

The data that is to be transmitted from the controller module 110 to the controller module 310 is stored temporarily in the buffer 151. The data that the controller module 210 has received from the controller module 110 is stored temporarily in the buffer 251. Also, after fail-over, the data that is to be transmitted from the controller module 210 to the controller module 310 is stored temporarily in the buffer 251. The data that the controller module 310 has received from the controller module 110 or the controller module 210 is stored temporarily in the buffer 351. The buffers 151, 251, and 351 are each divided into divided regions of the same number. Note that numbers assigned to the divided regions indicate IDs of the divided regions.

The buffer index table 152 contains entries of indexes of the data stored in each divided region of the buffer 151. Each index indicates address information of data and specifically includes a logical volume name, a logical block address (LBA), and a size. In the same way, the buffer index table 252 contains entries of indexes of the data stored in each divided region of the buffer 251, and the buffer index table 352 contains entries of indexes of the data stored in each divided region of the buffer 351. Note that, although not depicted, the buffer units of the controller modules 110a, 210a, and 310a include buffers and index tables.

A buffer set table 162 is stored in the management information memory unit 160 of the controller module 110. The buffer set table 162 contains entries of information indicating buffer sets utilized in the processing of asynchronous copy sessions. Information indicating a buffer set includes IDs of copy source divided regions and IDs of copy destination divided regions. For example, in FIG. 7, a combination of a copy source divided region (0000) and a copy destination divided region (2000) and a combination of a copy source divided region (0100) and a copy destination divided region (2100) are set as a buffer set of the same generation.

A buffer set table 262 is stored in the management information memory unit 260 of the controller module 210. The buffer set table 262 contains entries of information indicating buffer sets utilized in the processing of delta copy sessions. For example, in FIG. 7, a combination of a copy source divided region (1000) and a copy destination divided region (2000) and a combination of a copy source divided region (1100) and a copy destination divided region (2100) are set as a buffer set of the same generation.

In both of the buffer set table 162 and the buffer set table 262, copy destinations of each buffer set are set at divided regions of the same IDs, and such buffer sets are utilized as buffer sets of the same generation. According to this information setting method, the generation can be informed by transmitting the IDs of the copy destination divided regions from the controller module 110 to the controller module 210. Thereby, processing of switch and release of the generation (buffer set) can be synchronized between the controller module 110 and the controller module 210.

Note that a buffer set table that contains entries of the same information as the buffer set table 162 is stored in the management information memory unit of the controller module 110a. Also, a buffer set table that contains entries of the same information as the buffer set table 262 is stored in the management information memory unit of the controller module 210a.

Figure 8:
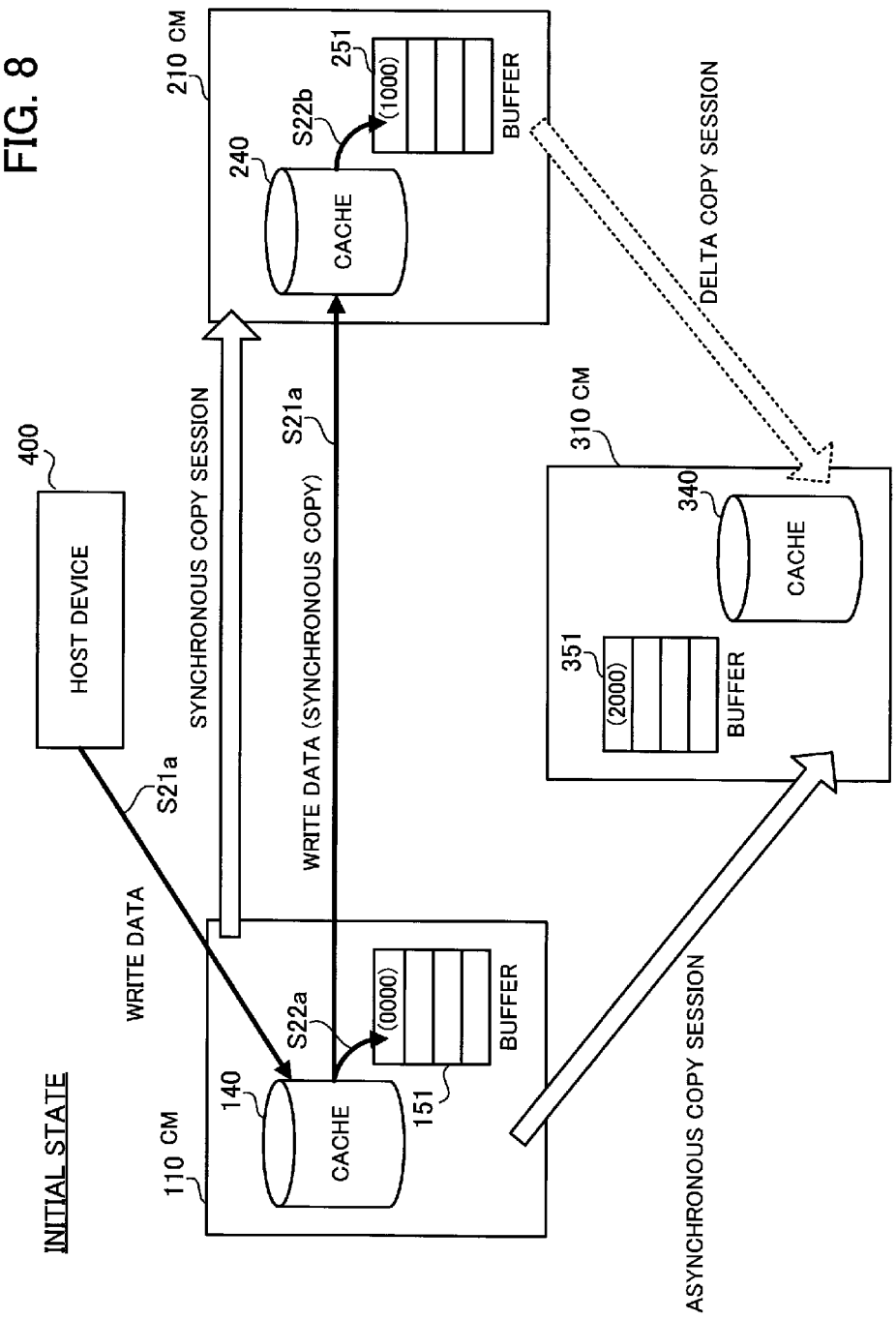
FIG. 8 is a first diagram illustrating an overview of an exemplary copy process when all storage devices operate normally.
Figure 9:
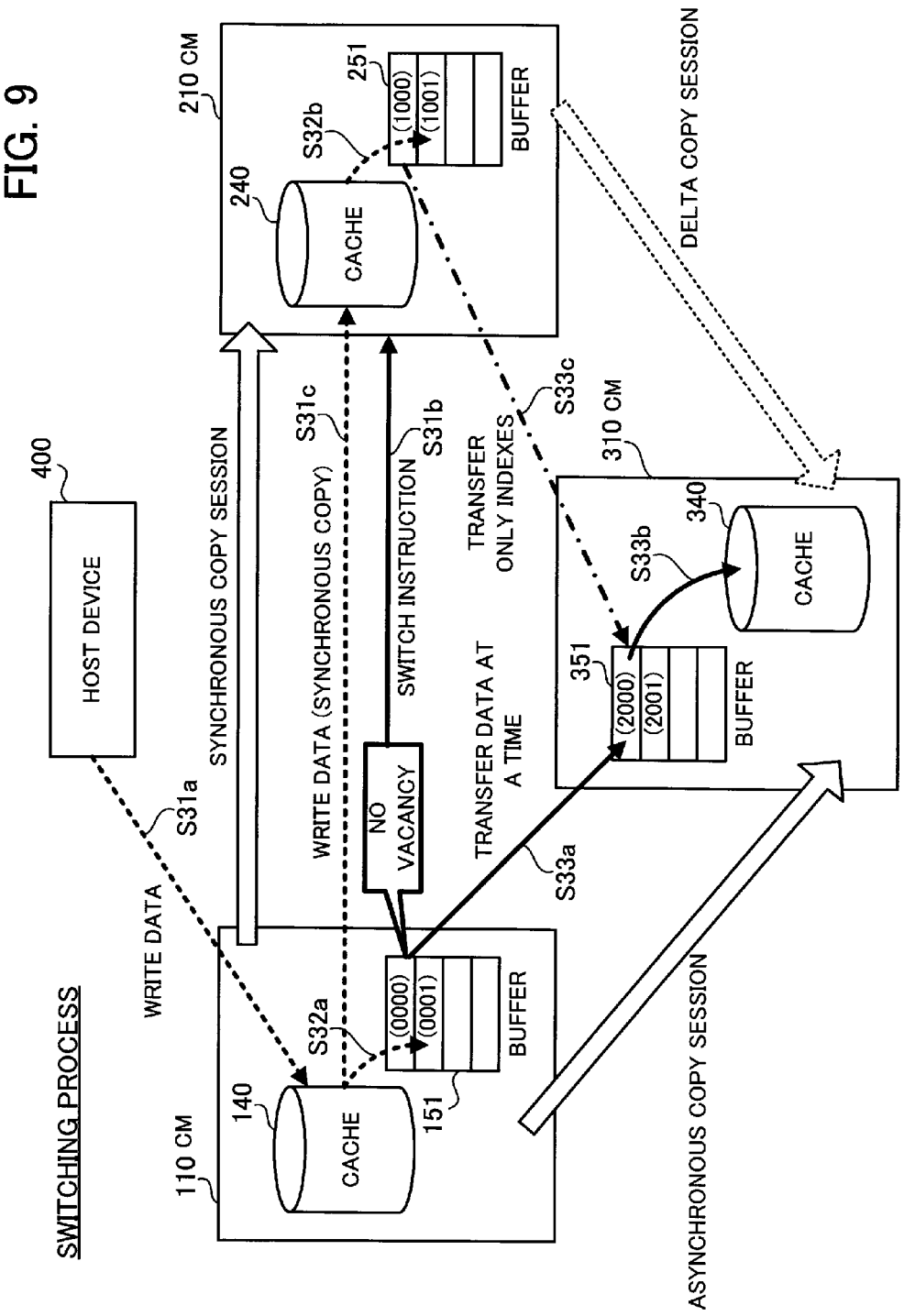
FIG. 9 is a second diagram illustrating an overview of an exemplary copy process when all storage devices operate normally.
Figure 10:
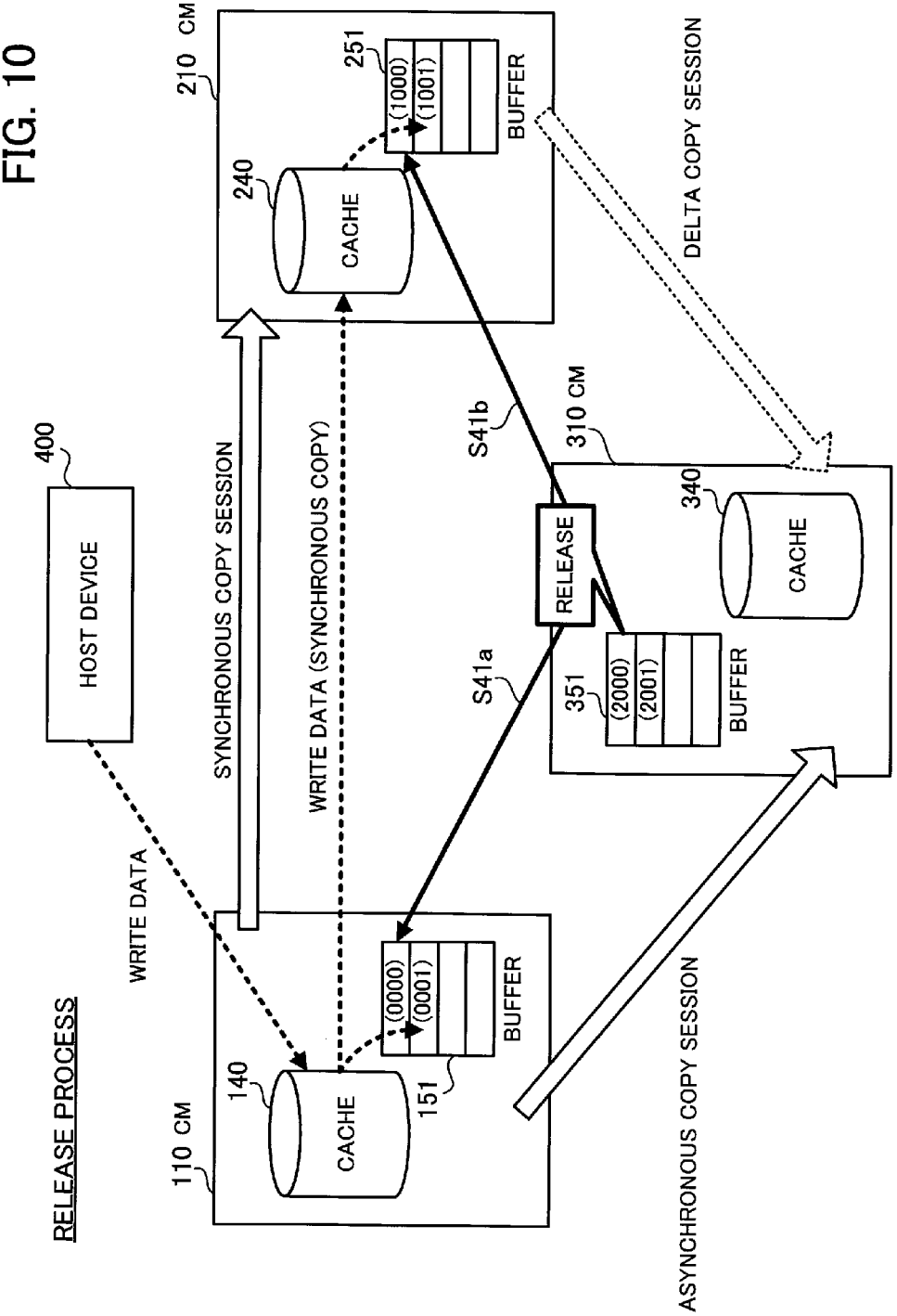
FIG. 10 is a third diagram illustrating an overview of an exemplary copy process when all storage devices operate normally.

Next, FIGS. 8 to 10 illustrate an overview of an exemplary copy process when all of the storage devices operate normally. As illustrated in FIG. 8, the host device 400 transmits a write request to the storage device 100 in an initial state. For example, upon receiving the write data for which a write is requested from the host device 400 (step S21a), the controller module 110 stores the write data in the cache 140 and transmits the write data to the controller module 210 (step S21b). The transmitted write data is stored in the cache 240 of the controller module 210. When the write data is stored in the caches 140 and 240, the controller module 110 transmits a write completion report to the host device 400. As described above, synchronous copy is performed between the controller module 110 and the controller module 210. Note that, in fact, an index of the write data is entered in the buffer index table 152 of the controller module 110 and the buffer index table 252 of the controller module 210 at this time point.

Also, the next process is executed at an asynchronous time from the write of the write data into the caches 140 and 240. The controller module 110 stores the write data in a divided region of the buffer 151 on the basis of index information, as a process of asynchronous copy session (step S22a). Also, the controller module 210 stores the write data in a divided region of the buffer 251 on the basis of the index information, as the process of a delta copy session (step S22b). The write data is stored in the divided regions (0000) and (1000) in the example of FIG. 8.

The data transmitted from the host device 400 is written into the caches 140 and 240 by the above procedure. Thereby, the data stored in the caches 140 and 240 are always identical with each other. Also, in parallel with this write, the data written in the cache 140 is stored in the buffer 151, and the data written in the cache 240 is stored in the buffer 251. Indexes are recorded in association with the divided regions, and therefore the data that is stored in the caches 140 and 240 until switch of the buffer set becomes storable in the divided regions (0000) and (1000), respectively. Thus, the data stored in the buffers 151 and 251 are always substantially identical with each other.

Note that the host device 400 can transmit a write request to the controller module 110a as well. In accordance with this write request, the controller modules 110a and 210a execute the same processing as the controller modules 110 and 210, respectively.

Thereafter, In a case where the controller module 110 has determined that there is no vacant region in the divided region (0000) when receiving a data write request from the host device 400 (step S31a) and it is impossible to store the data as illustrated in FIG. 9, the controller module 110 instructs a switch of the buffer set to the controller module 210 (step S31b). Thereby, the write destination divided regions of the data that is thereafter written into the caches 140 and 240 are switched synchronously in the controller module 110 and the controller module 210. In other words, the generation of the buffer set is switched synchronously in the controller module 110 and the controller module 210.

That is, after the switch instruction, the write data written in the cache 140 is transmitted to the controller module 210 and stored in the cache 240 (step S31c), and when the storage is completed, a write completion report is transmitted from the controller module 110 to the host device 400. Then, at an asynchronous time after this, the write data is stored in the next-generation buffer set, i.e. the divided regions (0001) and (1001), from the caches 140 and 240 (steps S32a and S32b).

Note that the switch instruction of the buffer set is also transmitted to the controller modules 110a and 210a. Thereby, the storage destination divided regions of the data are also switched in the controller modules 110a and 210a.

On the other hand, the next process is executed to the data in the buffer set of the previous generation. When all data that is written into the cache 140 until the occurrence of switch is stored in the divided region (0000), the controller module 110 transfers the data in the divided region to the controller module 310 as a process of asynchronous copy session (step S33a). That is, the controller module 110 transfers the data to the controller module 310 at a time with respect to each divided region. In this case, the controller module 110 transfers the ID "2000" of the storage destination divided region in the buffer 351 together with the data. The controller module 310 stores the received data temporarily in the divided region (2000) of the buffer 351, and when the storage is completed, writes the stored data into the cache 340 (step S33b).

Also, when all data that is written into the cache 240 until the occurrence of switch is stored in the divided region (1000), the controller module 210 transfers the indexes indicating the stored data to the controller module 310 as a process of delta copy session (step S33c). That is, the delta copy session is characteristic and different from the asynchronous copy session in that only the indexes are transferred and that the stored data is not transferred.

The controller module 310 verifies the data received from the controller module 110 against the indexes received from the controller module 210. Then, when succeeding in the verification, the controller module 310 instructs release of the buffer set to the controller modules 110 and 210, as illustrated in FIG. 10 (steps S41a and S41b). The controller modules 110, 210, and 310 release the divided regions (0000), (1000), and (2000), in other words set the divided regions (0000), (1000), and (2000) back to unused regions, respectively.

Note that, when completing the data storage from the divided region to the cache and succeeding in the verification using the indexes, the controller module 310a instructs the release of the buffer set to the controller modules 110a and 210a in the same way. Thereby, the divided regions that belong to the same generation are released synchronously in the controller modules 110a, 210a, and 310a as well.

As described above, according to the storage system of the present embodiment, timing of switch and release of the buffer set is synchronized between the storage devices 100, 200, and 300. Thereby, no matter when the storage device 100 stops operating, the data for which a write is requested from the host device 400 is saved unfailingly in each generation. Hence, the storage device 200 can perform fail-over to restart the asynchronous copy session from the storage device 200 to the storage device 300, while maintaining the order.

Figure 11:
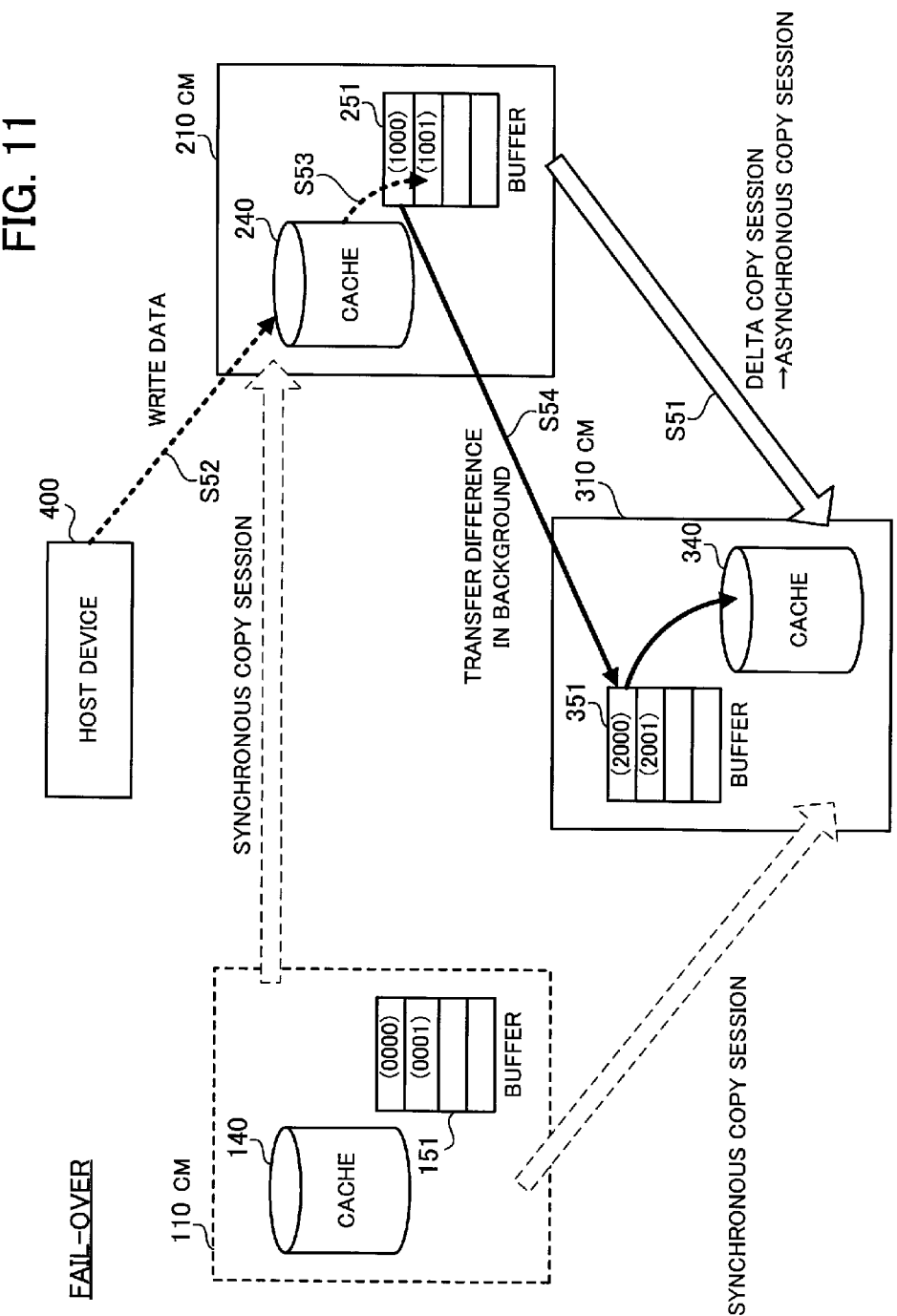
FIG. 11 illustrates an exemplary process at the time of fail-over.

FIG. 11 illustrates an exemplary process at the time of fail-over. With reference to FIG. 11, a specific example of a process at the time of fail-over will be described. FIG. 11 illustrates an exemplary process when the storage device 100 stops operating while the data is transferred from the divided region (0000) to the divided region (2000) as in FIG. 9.

When the storage device 100 stops operating, the write request destination from the host device 400 is automatically changed from the storage device 100 to the storage device 200 by an access destination control function of the host device 400. In this case, a logical write destination volume recognized by a business server function of the host device 400 is not changed, but a physical write destination is changed.

Also, the storage device 200 changes the delta copy session set in relation to the storage device 300 to an asynchronous copy session (step S51). Then, the controller module 210 recognizes that the divided region (1000) is being used as the data storage destination of the current generation, and starts receiving the write request from the host device 400.

The controller module 210 writes the write data received from the host device 400 into the cache 240 (step S52) and records the index of the write data in the buffer index table 252 in association with the divided region (1001). When the record of the index is completed, the controller module 210 transmits a write completion report to the host device 400. In this way, the access control according to the request from the host device 400 is taken over from the controller module 110 to the controller module 210. Further, the controller module 210 stores the data written in the cache 240 into the divided region (1001) at a predetermined time point (step S53).

On the other hand, the next process is executed as a process relevant to the previous generation, i.e. the divided regions (1000) and (2000). When the storage device 100 stops operating, and the data storage from the cache 240 to the divided region (1000) is completed, the data stored in the divided regions (1000) and (2000) are different from each other. Here, the controller module 210 retains indexes of all data to be stored in the divided region (1000). Hence, the controller module 210 can determine different data between the divided region (2000) and the divided region (1000), by comparing the indexes corresponding to the divided region (2000) retained by the controller module 310 and the divided region (1000) retained by the controller module 210.

The controller module 210 transfers only the determined different data from the divided region (1000) to the divided region (2000) of the controller module 310 (step S54). When the transfer is completed, and the data of the divided region (2000) is written into the cache 340, the divided regions (1000) and (2000) are released.

As described above, even when the data transfer from the buffer (0000) to the buffer (2000) is not completed, the same data as the buffer (0000) is contained in the buffer (1000). Hence, the controller module 210 can continue the uncompleted part of the data transfer by using the data contained in the buffer (1000). Thereafter, when the data storage to the buffer (1001) is completed, the data of the buffer (1001) is transferred to the buffer (2001), but the data of the buffer (2001) is not written into the cache 340 before the data of the buffer (2000) is written into the cache 340. Thus, the controller module 310 can write the data into the cache 340, while maintaining the order of writes from the host device 400.

Also, the above different data determination and the transfer processing by the controller module 210 can be executed in parallel with the write control into the cache 240 according to the write request from the host device 400. Hence, when the storage device 100 stops operating, the controller module 210 can seamlessly take over the access control according to the request from the host device 400 and execute the remaining process relevant to the buffer set of the previous generation in the background. Note that the controller module 210a and the controller module 310a operate in the same way.

Next, a process procedure of the storage system will be described with reference to sequence diagrams. In the below description, processing of the controller modules 110, 210, and 310 is described mainly, and processing of the controller modules 110a, 210a, and 310a will be described supplementally.

Figure 12:
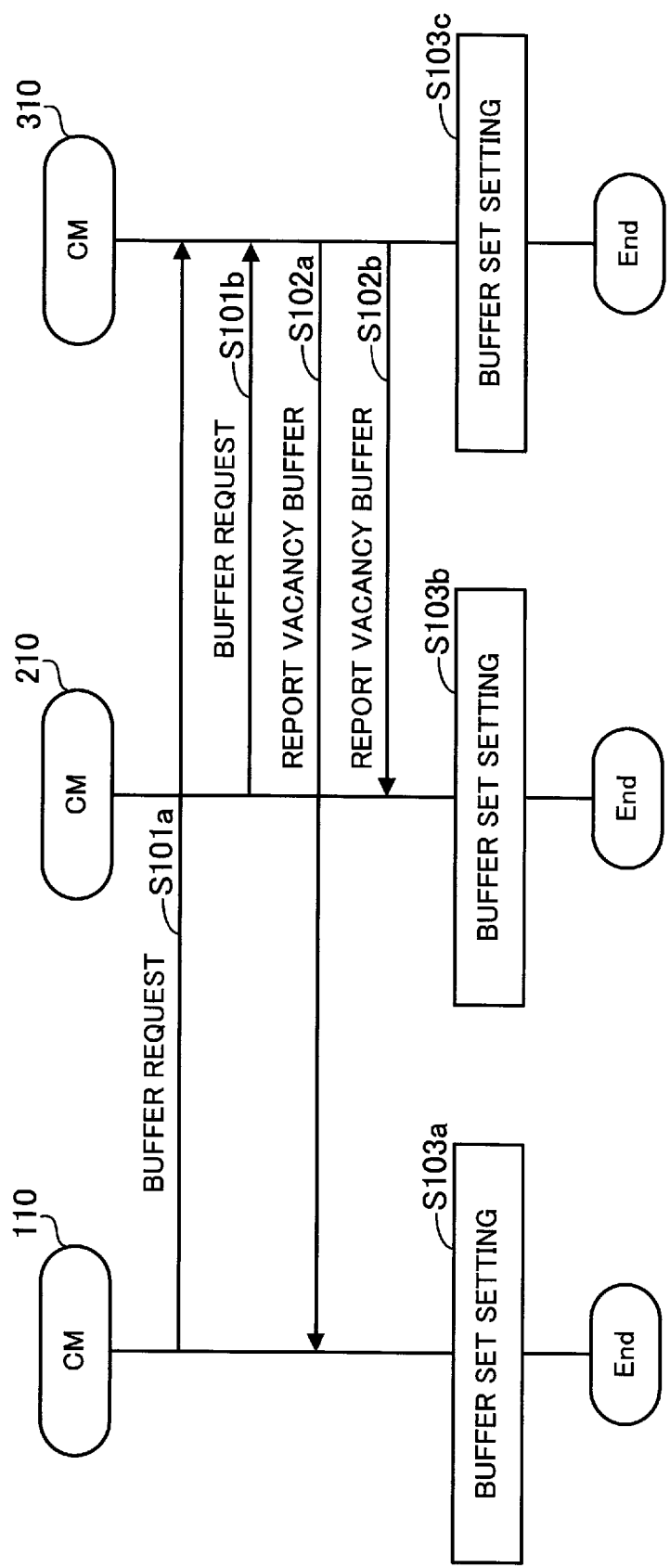
FIG. 12 is a sequence diagram illustrating an example of a process procedure of a buffer initial setting process.

First, processing when the storage devices 100, 200, and 300 operate normally will be described with reference to FIGS. 12 to 16. FIG. 12 is a sequence diagram illustrating an example of a process procedure of a buffer initial setting process.

The control unit 130 of the controller module 110 transmits a buffer request to the controller module 310 (step S101a). The control unit 230 of the controller module 210 transmits a buffer request to the controller module 310 in the same way (step S101b). The control unit 330 of the controller module 310 allocates regions of the buffer 351 in the RAM and reports information of the allocated regions, specifically IDs of the divided regions in the buffer 351, to the controller modules 110 and 210 (steps S102a and S102b).

Note that, in fact, the same process is also executed between the controller modules 110a and 210a and the controller module 310a. Also, the controller module 110a reports to the controller module 110 the information of the buffer reported from the controller module 310a and the information of the buffer allocated in the controller module 110a. In the same way, the controller module 210a reports to the controller module 210 the information of the buffer reported from the controller module 310a and the information of the buffer allocated in the controller module 210a.

Thereby, buffer sets are set in the controller modules 110, 210, and 310. That is, the control unit 130 of the controller module 110 creates the buffer set table 162, and sets the buffer set table 162 in the management information memory unit 160, and reports the buffer set table 162 to the controller module 110a (step S103a). Also, the control unit 230 of the controller module 210 creates the buffer set table 262, and sets the buffer set table 262 in the management information memory unit 260, and reports the buffer set table 262 to the controller module 210a (step S103b). The control unit 330 of the controller module 310 sets the information of the allocated buffers as management information (not depicted) (step S103c).

Figure 13:
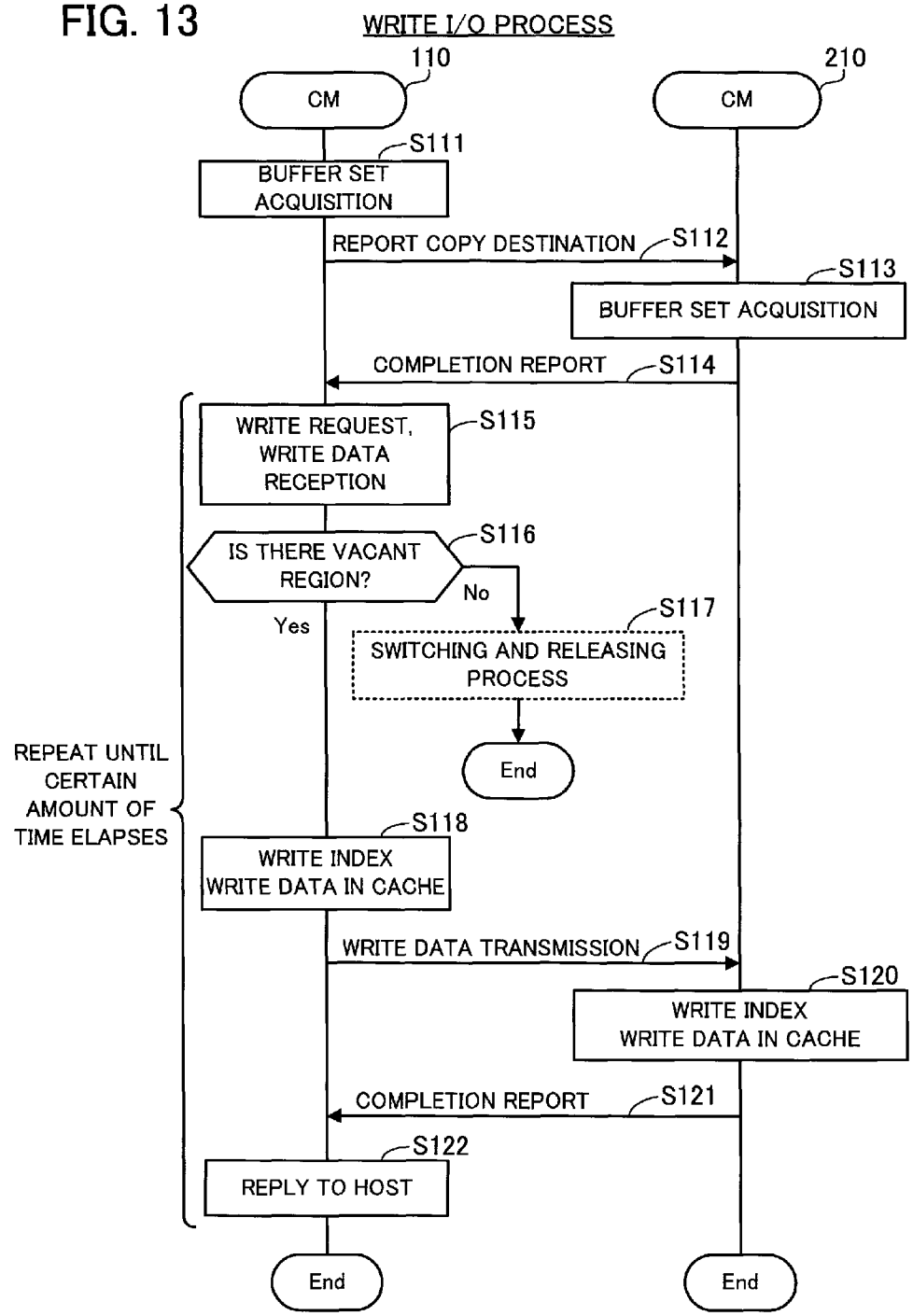
FIG. 13 is a sequence diagram illustrating an example of a process procedure of a write I/O process.

FIG. 13 is a sequence diagram illustrating an example of a process procedure of a write I/O process. The control unit 130 of the controller module 110 acquires a buffer set for the current generation (step S111). Specifically, the control unit 130 selects an unused buffer set from the buffer set table 162. Note that, although not depicted, the control unit 130 reports the acquired buffer set to the controller module 110a.

Next, the control unit 130 reports to the controller module 210 the ID of a copy destination divided region that is included in the acquired buffer set (step S112). The control unit 230 of the controller module 210 acquires the buffer set for the current generation on the basis of the reported ID of the divided region (step S113). Specifically, the control unit 230 selects a buffer set in which the reported divided region is set as a copy destination, from the buffer set table 262. Note that, although not depicted, the control unit 230 reports the acquired buffer set to the controller module 210a. The control unit 230 transmits a completion report of the buffer set acquisition to the controller module 110 (step S114).

Through the above process, the divided regions that belong to the same generation are associated between the storage device 100 and the storage device 200. Although the ID of the copy destination divided region is reported, a generation number for identifying a generation may be reported in step S112 in another example.

When the buffer set of the current generation is acquired by the above procedure, an I/O process according to a request from the host device 400 is started or restarted. The control unit 130 receives a data write request from the host device 400 and receives the write data (step S115). Then, the control unit 130 determines whether there is a vacant region enough to store the received write data in the copy source divided region in the buffer set of the current generation (step S116).

Figure 15:
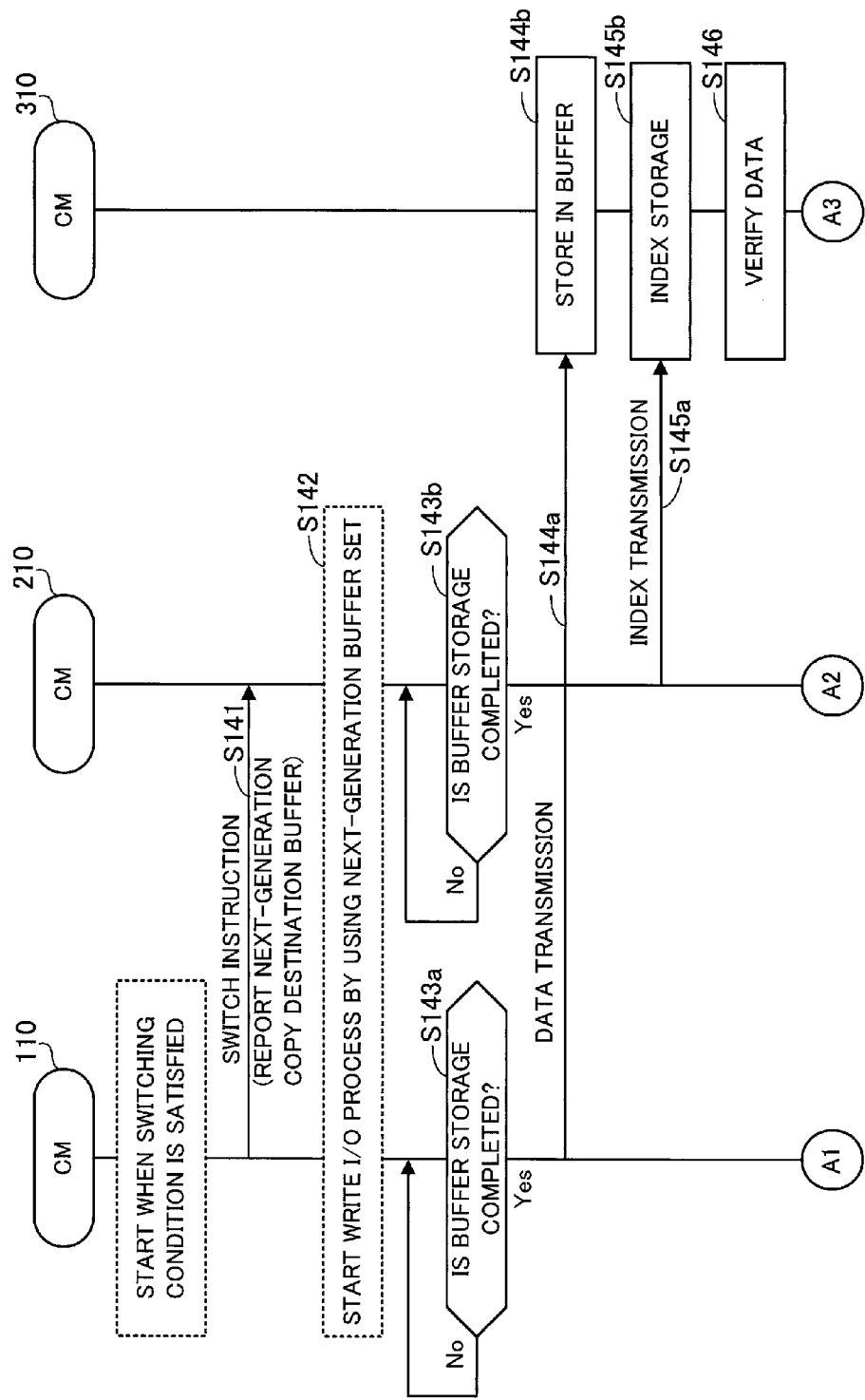
FIG. 15 is a first sequence diagram illustrating an example of a process procedure of a switching and releasing process.

If it is determined that there is not a vacant region in step S116, a switching and releasing process illustrated in FIG. 15 is started (step S117), and the write I/O process ends. In this case, the write I/O process ends in the controller modules 110a, 210, and 210a as well.

On the other hand, if it is determined that there is a vacant region in step S116, the control unit 130 writes the index of the write data into the region of the buffer index table 152 corresponding to the divided region of the current generation. In addition, the control unit 130 writes the write data into the cache 140 (step S118). Then, the control unit 130 transmits the write data to the controller module 210 (step S119). In this case, the ID of the copy destination divided region in the buffer set is attached to the write data and is transmitted. Note that the generation number may be attached instead of the ID of the copy destination divided region.

The control unit 230 writes the index of the received write data, into the region of the buffer index table 252 corresponding to the divided region of the current generation, i.e. the divided region of the ID that is attached to the write data. In addition, the control unit 230 writes the write data into the cache 240 (step S120). The control unit 230 transmits a completion report to the controller module 110, when the write of the index and the write data is completed (step S121). Upon receiving the completion report, the control unit 130 transmits to the host device 400 a reply indicating that the write is completed (step S122).

The above steps S115 to S122 are repeatedly executed until a certain amount of time elapses. When a certain amount of time has elapsed, the switching and releasing process is started in the same way as step S117, and the write I/O process ends.

Figure 14:
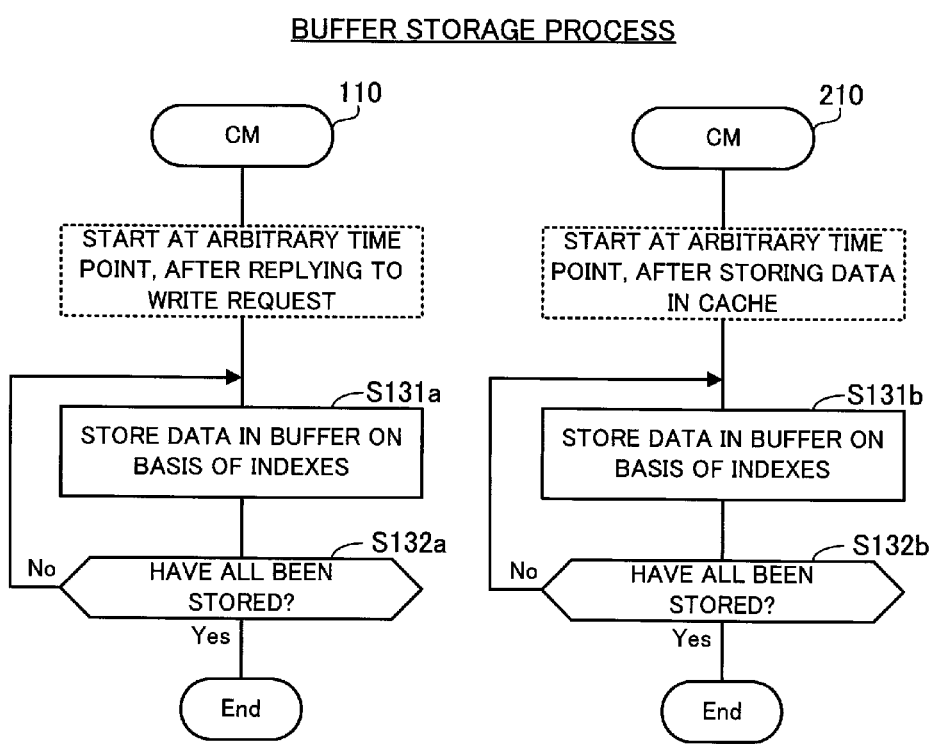
FIG. 14 is a sequence diagram illustrating an example of process procedures of buffer storage processes.

FIG. 14 is a sequence diagram illustrating an example of process procedures of buffer storage processes. The buffer storage processes illustrated in FIG. 14 are executed in parallel with the write I/O process at an arbitrary time point after the write I/O process illustrated in FIG. 13 is started.

The control unit 130 of the controller module 110 executes the following process at an arbitrary time point after replying to a first write request from the host device 400 during the write I/O process (i.e., after step S122 of FIG. 13 is executed first time). The control unit 130 stores the data written in the cache 140 into the divided region of the buffer 151 that belongs to the buffer set of the current generation, on the basis of the indexes corresponding to the buffer set of the current generation in the buffer index table 152 (step S131a). Note that the buffer set of the current generation is the buffer set acquired in step S111 of FIG. 13. The control unit 130 determines whether all data corresponding to the relevant indexes have been stored in the buffer 151 (step S132a), and if there is data that has not been stored yet, executes step S131a again, and ends the process upon completing the storage of all data. Note that the control unit of the controller module 110a executes the same process as the above.

On the other hand, the control unit 230 of the controller module 210 executes the following process at an arbitrary time point after storing the first data received from the controller module 110 in the cache 240 during the write I/O process (i.e., after step S120 of FIG. 13 is executed for the first time). The control unit 230 stores the data written in the cache 240 into the divided region of the buffer 251 that belongs to the buffer set of the current generation, on the basis of the indexes corresponding to the buffer set of the current generation in the buffer index table 252 (step S131b). Note that the buffer set of the current generation is the buffer set acquired in step S113 of FIG. 13. The control unit 230 determines whether all data corresponding to the relevant indexes is stored in the buffer 251 (step S132b), and if there is data that has not been stored yet, executes step S131b again, and ends the process upon completing the storage of all data. Note that the control unit of the controller module 210a executes the same process as the above.

Figure 16:
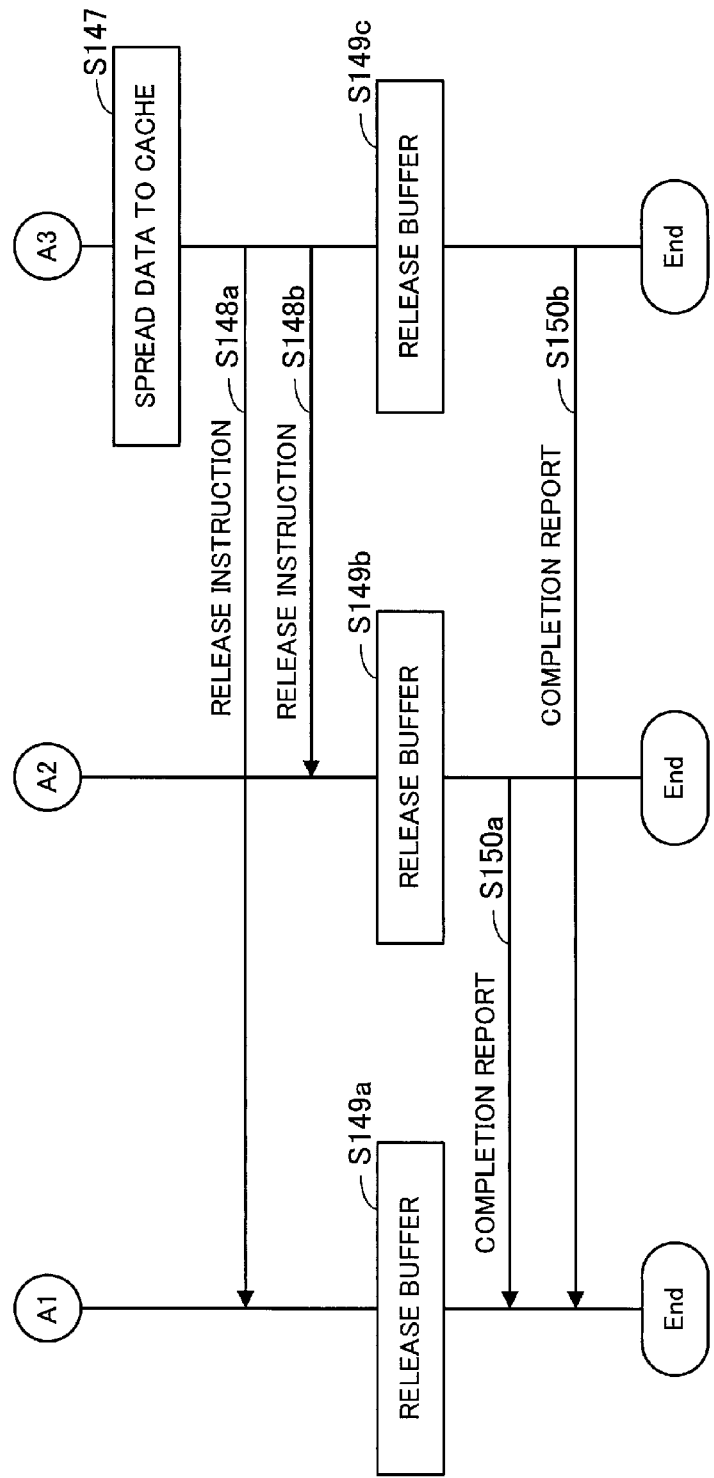
FIG. 16 is a second sequence diagram illustrating an example of a process procedure of a switching and releasing process.

FIGS. 15 and 16 are sequence diagrams illustrating an example of a process procedure of a switching and releasing process. When a switching condition for switching the buffer set is satisfied in the write I/O process illustrated in FIG. 13, the following switching and releasing process is started. The switching condition is satisfied when it is determined that there is not a vacant region in step S116 of FIG. 13 or when a certain amount of time has elapsed from the process start of FIG. 13.

The control unit 130 of the controller module 110 transmits a switch instruction of the buffer set to the controller module 210 (step S141). In this case, the control unit 130 also instructs the switch of the buffer set to the controller modules 110a and 210a. Thereby, the write I/O process of FIG. 13 is started by using the next-generation buffer set in the controller modules 110, 110a, 210, and 210a (step S142).

Next, the control unit 130 determines whether the data storage process into the buffer 151 in step S131a of FIG. 14 is completed (step S143a), and if the data storage process is not completed, awaits completion of the data storage process. When the data storage process is completed, the control unit 130 transmits to the controller module 310 the data stored in the divided region of the buffer 151 corresponding to the buffer set of the current generation (step S144a). At this time, the control unit 130 transmits the data together with the ID of the data storage destination divided region (the ID of the copy destination divided region in the buffer set of the current generation). The control unit 330 of the controller module 310 receives the data and stores the received data in the divided region indicated by the ID attached to the data, among the divided regions of the buffer 351 (step S144b).

On the other hand, the control unit 230 of the controller module 210 determines whether the data storage process into the buffer 251 in step S131b of FIG. 14 is completed (step S143b), and if the data storage process is not completed, awaits completion of the data storage process. When the data storage process is completed, the control unit 230 transmits to the controller module 310 the indexes corresponding to the buffer set of the current generation in the buffer index table 252 (step S145a). The control unit 330 of the controller module 310 receives the indexes from the controller module 210 and stores the indexes temporarily in the RAM for example (step S145b).

The control unit 330 verifies the data by using the indexes received in step S145b (step S146). Specifically, the control unit 330 determines whether the data corresponding to all the received indexes is received in step S144b. If it is determined that the data corresponding to all the received indexes is received, the control unit 330 spreads the data stored in the divided region of the buffer 351 to the cache 340 in step S144b (step S147).

As described above, the data retained by the controller module 210 and the data retained by the controller module 310 are made identical with each other unfailingly by performing the verification of step S146, thereby improving the reliability of the copy process in the storage system. Note that, if the verification fails in step S146, different data is transferred from the controller module 210 to the controller module 310, for example.

When the spreading of step S147 is completed, the control unit 330 transmits a release instruction of the buffer set to the controller modules 110 and 210 (steps S148a and S148b). The control units 130, 230, and 330 release the divided regions that belong to the buffer set of the current generation (steps S149a, S149b, and S149c). When the release is completed, the control unit 230 reports completion of the release to the controller module 110 (step S150a). Also, when the release is completed, the control unit 330 reports completion of the release to the controller module 110 (step S150b).

Note that the process after steps S143a and S143b in FIGS. 15 and 16 is also executed in the controller modules 110a, 210a, and 310a. When the releases of steps S149a to S149c are completed, the completion of the releases is reported from the controller modules 110a, 210a, and 310a to the controller module 110.

Figure 17:
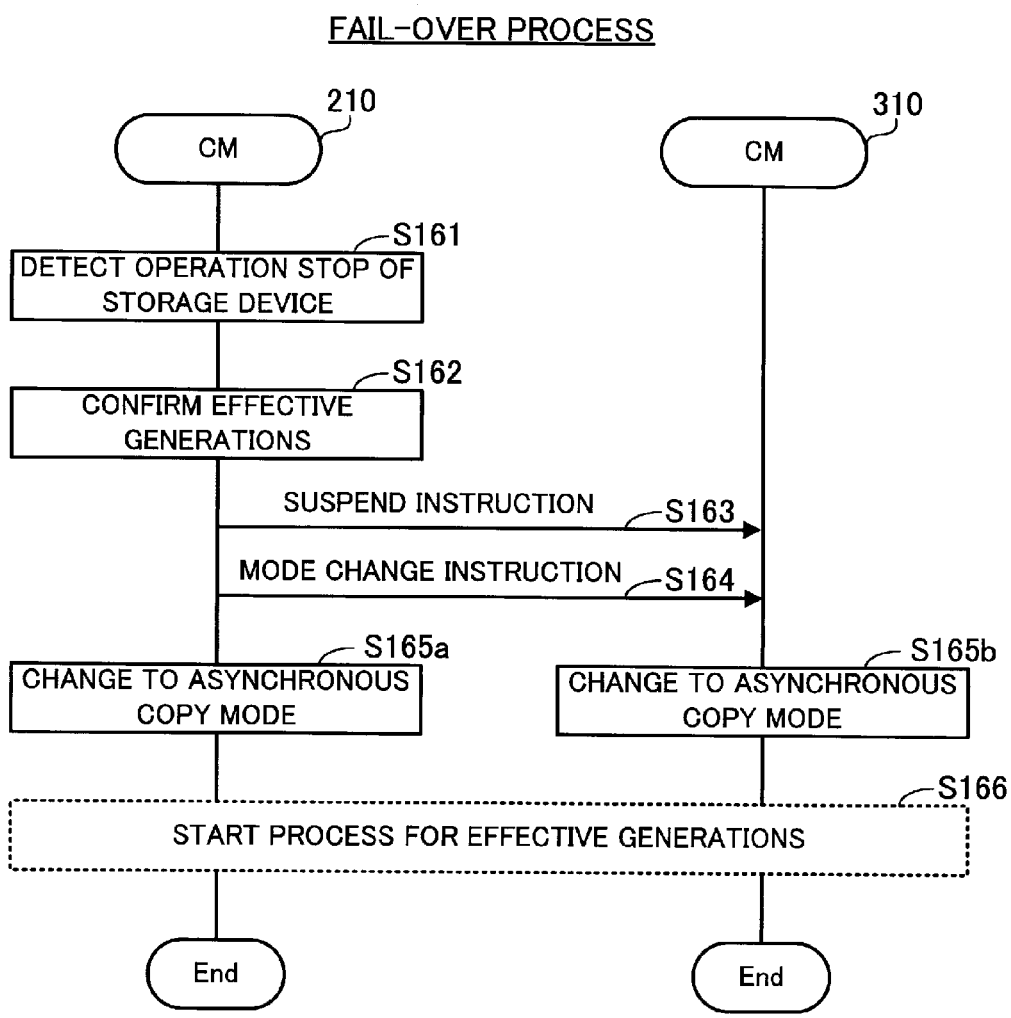
FIG. 17 is a sequence diagram illustrating an example of a process procedure of a fail-over process.

Next, a process performed when the storage device 100 stops operating due to a failure or the like will be described with reference to FIGS. 17 to 20. FIG. 17 is a sequence diagram illustrating an example of a process procedure of a fail-over process.

Upon detecting that the storage device 100 has stopped operating (step S161), the control unit 230 of the controller module 210 confirms generations of effective buffer sets (step S162). The effective buffer sets mean unreleased buffer sets in use. Also, the control unit 230 transmits a suspend instruction of the delta copy session to the controller module 310 (step S163). Further, the control unit 230 instructs the controller module 310 to change the operation mode in the delta copy session to the asynchronous mode (step S164). Note that the instructions of steps S163 and S164 are transmitted to the controller modules 210a and 310a as well.

Thereby, the control unit 230 of the controller module 210 and the control unit 330 of the controller module 310 change the operation mode in the delta copy session to the asynchronous copy mode (steps S165a and S165b). In the asynchronous copy mode, the same copy process as the asynchronous copy session is performed between the controller module 210 and the controller module 310. In the same way, the operation mode in the delta copy session is changed to the asynchronous copy mode in the controller modules 210a and 310a.

Figure 20:
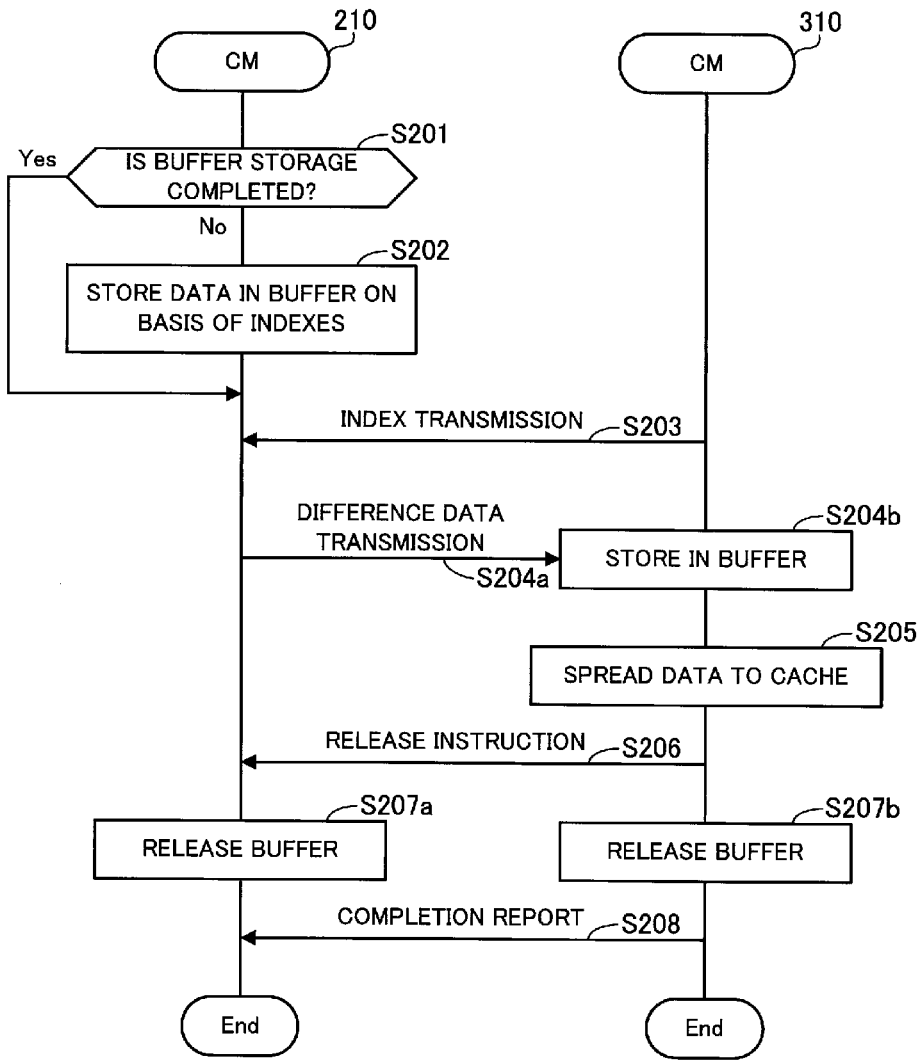
FIG. 20 is a sequence diagram illustrating a process procedure of a re-synchronization process with regard to a generation after switch.

Thereafter, the controller modules 210, 210a, 310, and 310a start a process for the generations of the effective buffer sets (step S166). The generations of the effective buffer sets includes a "generation before switch" for which the buffer set has not been switched since the start of use of the buffer set and a "generation after switch" for which the buffer set has been switched. The process of FIG. 18 is started for the generation before switch, and the process of FIG. 20 is started for the generation after switch.

Figure 18:
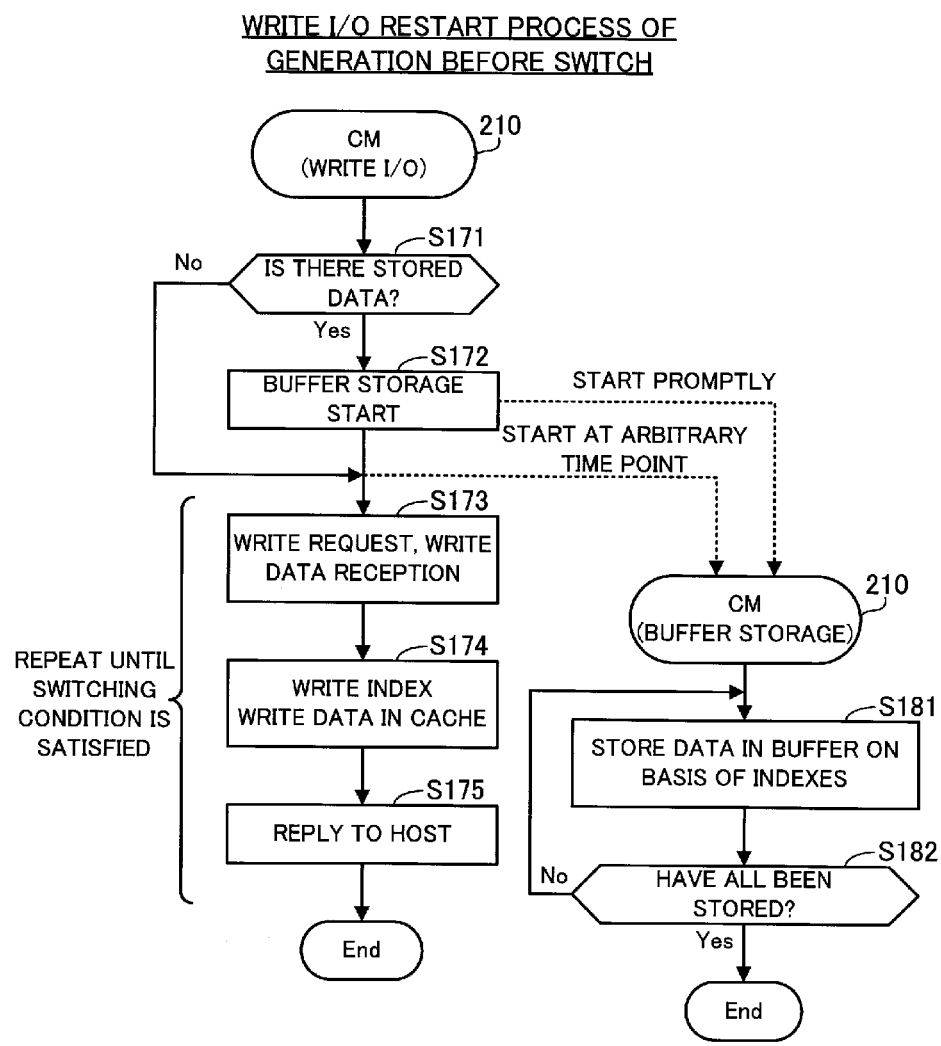
FIG. 18 is a sequence diagram illustrating a process procedure of a write I/O restart process with regard to a generation before switch.

FIG. 18 is a sequence diagram illustrating a process procedure of a write I/O restart process for the generation before switch. In the generation before switch, the storage device 100 stops operating, before the host device 400 requests a data write of an amount occupying the corresponding divided region. Hence, the controller module 210 takes over the write control according to the request from the host device 400, from the controller module 110 through the following write I/O process.

In the write I/O process, first, the control unit 230 of the controller module 210 determines whether the data received from the controller module 110 has been written in the cache 240 and has been stored in the divided region of the buffer 251 (step S171). The data that has been written in the cache 240 is the data corresponding to the indexes of the relevant generation (the generation before switch) entered in the buffer index table 252. Also, the data that has been already stored means data for which the storage process from the cache 240 to the divided region is already started.

If there is the data that has been already stored, the control unit 230 promptly starts a buffer storage process for storing the data that has been written in the cache 240 in the divided region, which is illustrated in the right side of FIG. 18 (step S172) in parallel with the write I/O process. On the other hand, if there is not the data that has been already stored, the control unit 230 starts the buffer storage process at an arbitrary time point.

Next, when the transmission destination of the write request from the host device 400 is changed to the storage device 200, the control unit 230 starts receiving the write request from the host device 400. That is, the control unit 230 receives the data write request from the host device 400 and receives the write data (step S173). The control unit 230 writes the index of the write data into the region of the buffer index table 252 corresponding to the divided region of the relevant generation. In addition, the control unit 230 writes the write data into the cache 240 (step S174). Then, the control unit 230 transmits a reply indicating that the write has completed to the host device 400 (step S175).

Steps S173 to S175 are repeated until the switching condition of the buffer set is satisfied. The switching condition is satisfied, when the divided region of the relevant generation runs out of remaining capacity, or when a certain amount of time has elapsed.

On the other hand, in the buffer storage process, the control unit 230 stores the data written in the cache 140 into the divided region of the relevant generation in the buffer 251 on the basis of the indexes corresponding to the buffer set of the relevant generation in the buffer index table 252 (step S181). The control unit 230 determines whether all data corresponding to the relevant indexes have been stored in the divided region (step S182), and if there is the data that has not been stored yet, executes step S181 again and ends the process upon completing the storage of all data.

Figure 19:
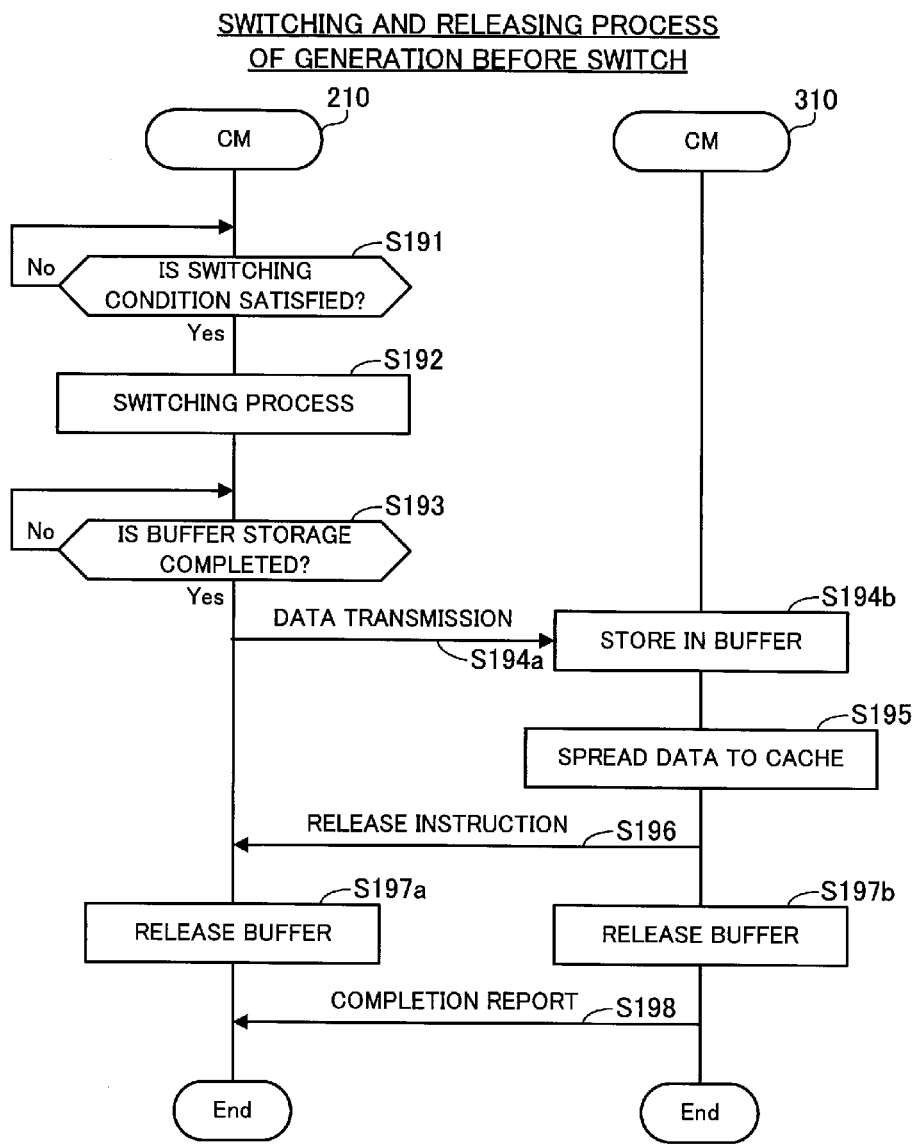
FIG. 19 is a sequence diagram illustrating a process procedure of a switching and releasing process with regard to a generation before switch.

FIG. 19 is a sequence diagram illustrating a process procedure of a switching and releasing process for the generation before switch. The control unit 230 of the controller module 210 monitors whether the switching condition of the buffer set is satisfied during execution of the write I/O restart process of FIG. 18 (step S191). If the switching condition is satisfied, the control unit 230 executes a switching process for switching the buffer set (step S192). Specifically, the control unit 230 instructs a switch of the buffer set to the controller module 210a and starts the write I/O process using a new buffer set. Thereby, the controller modules 210 and 210a each acquire the new buffer set, and steps S173 to S175 of FIG. 18 are executed by using the acquired buffer set in parallel with the process of FIG. 19.

Next, the control unit 230 determines whether the data storage process into the buffer 251 in step S181 of FIG. 18 is completed (step S193), and if the data storage process is not completed, awaits the completion of the data storage process. Then, if the data storage process is completed, the control unit 230 transmits to the controller module 310 the data stored in the divided region of the buffer 251 corresponding to the buffer set of the relevant generation (step S194a). In this case, the control unit 230 transmits the data together with the ID of the data storage destination divided region.

The control unit 330 of the controller module 310 receives the data and stores the received data in the divided region of the buffer 351 indicated by the ID attached to the data (step S194b). When the storage of the data into the divided region is completed, the control unit 330 spreads the data of the divided region to the cache 340 (step S195).

When the spreading is completed, the control unit 330 instructs release of the buffer set to the controller module 210 (step S196). The control units 230 and 330 release the divided regions that belong to the buffer set of the relevant generation (steps S197a and 197b). When the release is completed, the control unit 330 reports completion of the release to the controller module 210 (step S198). Thereby, the copy process for the relevant generation is completed.

The controller module 210 can take over the access control according to the request from the host device 400 in a short time by the above process of FIGS. 18 and 19. In addition, the controller module 210 can execute asynchronous copy by using the buffer set of the newest generation acquired immediately before the takeover.

FIG. 20 is a sequence diagram illustrating a process procedure of a re-synchronization process for the generation after switch. The same data as the cache 140 of the controller module 110 that has stopped operating is written in the cache 240 of the controller module 210. Also, the indexes of the data to be stored in the relevant divided region is recorded in the buffer index table 252 of the controller module 210. Thus, the control unit 230 of the controller module 210 determines whether the storage of the data into the relevant divided region from the cache 240 is completed, on the basis of the indexes (step S201). If the storage is not completed, the control unit 230 stores the data into the relevant divided region from the cache 240 on the basis of the indexes (step S202). On the other hand, if the storage is completed, step S202 is skipped.

Next, the control unit 230 specifies the ID of the copy destination divided region that belongs to the buffer set of the relevant generation, and requests the controller module 310 to transmit the indexes corresponding to this divided region. The control unit 330 of the controller module 310 reads out the indexes corresponding to the specified divided regions from the buffer index table 352, and transmits the indexes to the controller module 210 (step S203).

The control unit 230 compares the indexes referred in step S201 and the indexes received from the controller module 310. The control unit 230 determines different data between the data stored in the relevant divided region of the controller module 210 and the data stored in the relevant divided region of the controller module 310, on the basis of the comparison result. The control unit 230 reads out the different data from the divided region and transmits the different data to the controller module 310 together with the ID of the storage destination divided region (step S204a). The control unit 330 receives the different data and stores the different data in the relevant divided region (step S204b). Thereby, identical data is stored in both of the copy source divided region and the copy destination divided region that belong to the buffer set of the relevant generation.

When the storage of the different data is completed, the control unit 330 spreads all data stored in the divided region to the cache 340 (step S205). When the spreading is completed, the control unit 330 instructs release of the buffer set to the controller module 210 (step S206). Then, the control units 230 and 330 release the divided regions that belong to the buffer set of the relevant generation (steps S207a and S207b). When the release is completed, the control unit 330 reports completion of the release to the controller module 210 (step S208).

Note that the above process of FIG. 20 is also executed in the controller modules 210a and 310a. Note that, when the release of steps S207a and S207b is completed, the completion of the release is reported to the controller module 210.

In the above process, the data transfer from the controller module 210 to the controller module 310 is performed for each buffer set in each of the processes of FIGS. 18 and 19 and the processes of FIG. 20. Thereby, the asynchronous copy can be executed with the order maintained, even after the fail-over.

Also, the processes of FIGS. 18 and 19 and the processes of FIG. 20 are executed in parallel. Thereby, for example, when the access control process according to the request from the host device 400 in steps S173 to S175 of FIG. 18 is started, the data copy process can be executed for the different generation in FIG. 20 in the background. Thus, not only the data is backed up in the storage device 300 with the order maintained, but the storage device 200 can take over the access control according to the request from the host device 400 in a short time.

Note that the processing functions of the devices (for example, the control devices 10, 20, and 30, and the controller modules 110, 110a, 210, 210a, 310, and 310a) illustrated in each of the above embodiments can be each configured with a computer. In that case, a program that describes procedures of the functions of each device is provided and executed in the computer, so that the above processing functions are implemented in the computer. The program describing the procedures may be stored in a computer-readable storage medium. The computer-readable storage medium is, for example, a magnetic memory device, an optical disc, a magneto-optical storage medium, or a semiconductor memory. The magnetic memory device is, for example, a hard disk device (HDD), a flexible disk (FD), or a magnetic tape. The optical disc is, for example, a digital versatile disc (DVD), a DVD-RAM, a CD-ROM (Compact Disc-Read Only Memory), or a CD-R(Recordable)/RW(Re-Writable). The magneto-optical storage medium is, for example, a magneto-optical disk (MO).

In order to put a program in the market, a portable storage medium, such as a DVD and a CD-ROM, storing the program is sold, for example. Also, a program may be stored in a memory device of a server computer to be transmitted from the server computer to other computers via a network.

For example, a computer reads a program stored in a portable storage medium or receives a program transferred from a server computer, in order to store the program in its own memory device and execute the program. Then, the computer reads the program from the its own memory device and performs processing in accordance with the program. Note that the computer may read the program directly from a portable storage medium and perform processing in accordance with the program. Also, the computer can sequentially perform processing in accordance with a received program, each time a program is transferred from a server computer connected via a network.

In one aspect, the order of data for which asynchronous copy has not been executed is maintained.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage system comprising:
a first control device;
a second control device; and
a third control device,
wherein the first control device includes:
   a first buffer including a first region and a second region, and
   a first processor configured to execute:
      a synchronous copy process for writing first data for which a write is requested from a host device into a first storage medium, transmitting the first data to the second control device, and reporting write completion to the host device,
      a storage process for storing the first data, which has been written in the first storage medium, into the first region, and when a predetermined condition is satisfied, transmitting an instruction of a buffer switch to the second control device, and switching a data storage destination in the first buffer to the second region with respect to second data that is written into the first storage medium after the instruction, and
      an asynchronous copy process for transmitting third data stored in the first region to the third control device at a time, and transmitting fourth data stored in the second region to the third control device at a time,
the second control device includes:
   a second buffer including a third region and a fourth region, and
   a second processor configured to store the first data transmitted from the first processor in a second storage medium and the third region, and when receiving the instruction of the buffer switch, store the second data in the second storage medium and the fourth region,
the third control device includes:
   a third buffer including a fifth region and a sixth region, and
   a third processor configured to receive the third data to store the third data in a third storage medium via the fifth region, and receive the fourth data to store the fourth data in the third storage medium via the sixth region.

2. The storage system according to claim 1, wherein
when the first control device stops operating after the instruction of the buffer switch, the second processor takes over from the first processor a process of receiving a write request from the host device, stores fifth data for which a write is requested in the second storage medium and the fourth region, and transmits the first data stored in the third region to the third control device, and
the third processor receives the first data transmitted from the second processor, and stores the first data in the third storage medium via the fifth region.

3. The storage system according to claim 2, wherein
when the first control device stops operating after the instruction of the buffer switch, the second processor transmits unreceived data of the first data that the third control device has not received from the first control device, from the third region to the third control device.

4. The storage system according to claim 3, wherein
the second processor executes reception of the fifth data for which a write is requested from the host device, and storage into the second storage medium and the fourth region, in parallel with transmission of the unreceived data from the third region to the third control device.

5. The storage system according to claim 1, wherein
when the first control device is in operation, and the third processor completes a process for storing the third data received from the first processor in the third storage medium via the fifth region, the third processor transmits an instruction of buffer release to the first control device and the second control device and changes the fifth region to an unused region,
the first processor changes the first region to an unused region in accordance with the instruction of the buffer release, and
the second processor changes the third region to an unused region in accordance with the instruction of the buffer release.

6. The storage system according to claim 1, wherein
the predetermined condition is that an amount of the first data written in the first storage medium has reached a capacity of the first region.

* * * * *

UNITED STATES PATENT AND TRADEMARK OFFICE
CERTIFICATE OF CORRECTION

PATENT NO. : 10,007,467 B2
APPLICATION NO. : 15/450086
DATED : June 26, 2018
INVENTOR(S) : Hidenori Yamada Page 1 of 1

It is certified that error appears in the above-identified patent and that said Letters Patent is hereby corrected as shown below:

On the Title Page

"(73) Assignee: FUJITSU LIIMTED, Kawasaki-shi (JP)" should read --(73) Assignee: FUJITSU LIMITED, Kawasaki-shi (JP)--.

Signed and Sealed this
Eighteenth Day of June, 2019

Andrei Iancu
*Director of the United States Patent and Trademark Office*